United States Patent
Yoshida

(10) Patent No.: US 9,043,514 B2
(45) Date of Patent: May 26, 2015

(54) DATA TRANSFER DEVICE AND METHOD

(71) Applicant: FUJITSU SEMICONDUCTOR LIMITED, Yokohama-shi, Kanagawa (JP)

(72) Inventor: Yuji Yoshida, Nagoya (JP)

(73) Assignee: FUJITSU SEMICONDUCTOR LIMITED, Yokohama (JP)

( * ) Notice: Subject to any disclaimer, the term of this patent is extended or adjusted under 35 U.S.C. 154(b) by 10 days.

(21) Appl. No.: 14/011,264

(22) Filed: Aug. 27, 2013

(65) Prior Publication Data

US 2014/0095744 A1 Apr. 3, 2014

(30) Foreign Application Priority Data

Oct. 2, 2012 (JP) ................................. 2012-220497

(51) Int. Cl.
*G06F 5/01* (2006.01)
*H04N 5/04* (2006.01)
*H04N 7/18* (2006.01)
*G06F 5/14* (2006.01)

(52) U.S. Cl.
CPC .. *G06F 5/14* (2013.01); *H04N 5/04* (2013.01); *H04N 7/18* (2013.01)

(58) Field of Classification Search
CPC ............... G06F 5/14; H04N 5/04; H04N 7/18
See application file for complete search history.

(56) References Cited

U.S. PATENT DOCUMENTS

| 4,912,549 A * | 3/1990 | Altman et al. ................. 348/496 |
| 5,500,682 A * | 3/1996 | Fue et al. ...................... 348/497 |
| 5,513,145 A * | 4/1996 | Hattori et al. ................. 365/221 |
| 2002/0015053 A1 * | 2/2002 | Fukuda et al. ................ 345/660 |
| 2005/0249280 A1 * | 11/2005 | Kondo et al. ............. 375/240.03 |
| 2009/0213925 A1 | 8/2009 | Inagaki et al. |

FOREIGN PATENT DOCUMENTS

| JP | 8-63136 A | 3/1996 |
| JP | 8-294033 A | 11/1996 |
| JP | 2009-200938 A | 9/2009 |

* cited by examiner

*Primary Examiner* — Eric Oberly
(74) *Attorney, Agent, or Firm* — Arent Fox LLP

(57) ABSTRACT

A transfer control circuit stores data in a FIFO memory, outputs data in the FIFO memory in response to a data request signal, and outputs a state signal in accordance with an amount of stored data in the FIFO memory. An output data generating unit outputs image data having a horizontal image size in accordance with a horizontal count value and a horizontal synchronizing signal, and thereafter, outputs blank data. When the state signal indicates that the FIFO memory is in a "EMPTY" or "MODERATE" storage state, a blank control unit outputs a blank addition signal until the FIFO memory changes to a "FULL" storage state.

11 Claims, 18 Drawing Sheets

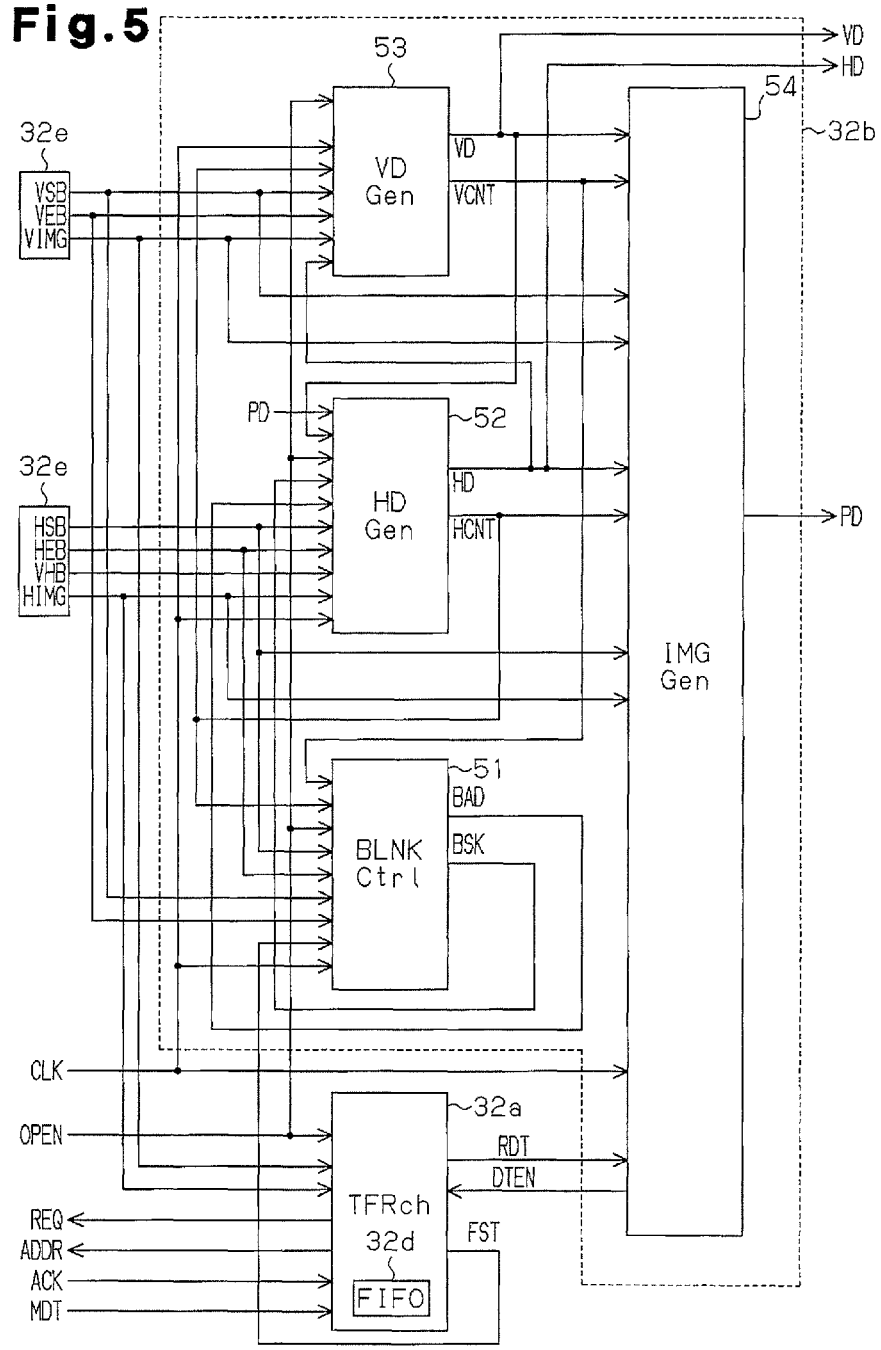

DATA TRANSFER DEVICE AND METHOD

CROSS-REFERENCE TO RELATED APPLICATIONS

This application is based upon and claims the benefit of priority from prior Japanese Patent Application No. 2012-220497, filed on Oct. 2, 2012, the entire contents of which are incorporated herein by reference.

FIELD

The present disclosure is related to a data transfer device, a data transfer method and a semiconductor device.

BACKGROUND

Devices that handle image data transfer image data such as moving images and still images in accordance with a horizontal synchronizing signal and a vertical synchronizing signal. For example, refer to Japanese Laid-Open Patent Publication Nos. 8-63136 and 2009-200938. A device receives image data, stores the image data in a memory, reads the image data from the memory, and performs image processing such as decoding on the read image data. For example, the device may be a digital still camera which displays image data read from a memory on a display unit.

SUMMARY

A device includes various processing circuits, whereby each processing circuit accesses a memory to write in data and read data. Access requests to the memory from two or more processing circuits may occur simultaneously. When access requests to the memory conflict with each other, access to the memory by one or more processing circuits needing image data may be delayed from a desired timing. Delay of access to the memory may result in a so-called transfer failure where one or a plurality of processing circuits are unable to acquire necessary image data at desired timings. For example, when a digital still camera transfers image data to a display unit, a delayed readout of image data from the memory may result in the read image data missing a desired transfer timing to the display unit. The transfer failure may cause a disturbance in the image displayed on the display unit.

According to an aspect of the invention, a data transfer device includes a transfer control circuit that reads data stored in a first storage unit to store the data in a second storage unit, outputs data in the second storage unit in response to a data request signal, and outputs a state signal in accordance with an amount of stored data in the second storage unit, wherein the state signal indicates whether the second storage unit is in a first storage state in which the amount of stored data in the second storage unit is relatively large or in a second storage state in which the amount of stored data in the second storage unit is relatively small; a blank control unit that receives the state signal from the transfer control circuit and outputs a blank addition signal, wherein when the state signal indicates that the second storage unit is in the second storage state, the blank control unit outputs the blank addition signal until the second storage unit changes to the first storage state based on the state signal; a horizontal synchronizing signal generating unit that generates a horizontal synchronizing signal and delays, in accordance with the blank addition signal, a horizontal count value and the horizontal synchronizing signal, which is output in accordance with the horizontal count value and a standard number of pieces of output data; and an output data generating unit that receives image data having a horizontal image size from the transfer control circuit and outputs the image data having the horizontal image size in accordance with the horizontal count value and the horizontal synchronizing signal, wherein after the outputting the image data having the horizontal image size is completed, the output data generating unit outputs blank data until a next horizontal synchronizing signal is outputted.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

The embodiment, together with objects and advantages thereof, may best be understood by reference to the following description of the presently preferred embodiments together with the accompanying drawings in which:

FIG. 5 is a block diagram of a signal generating unit;

DESCRIPTION OF EMBODIMENTS

A data transfer device and a semiconductor device according to an embodiment will be described with reference to the accompanying drawings.

Figure 1:
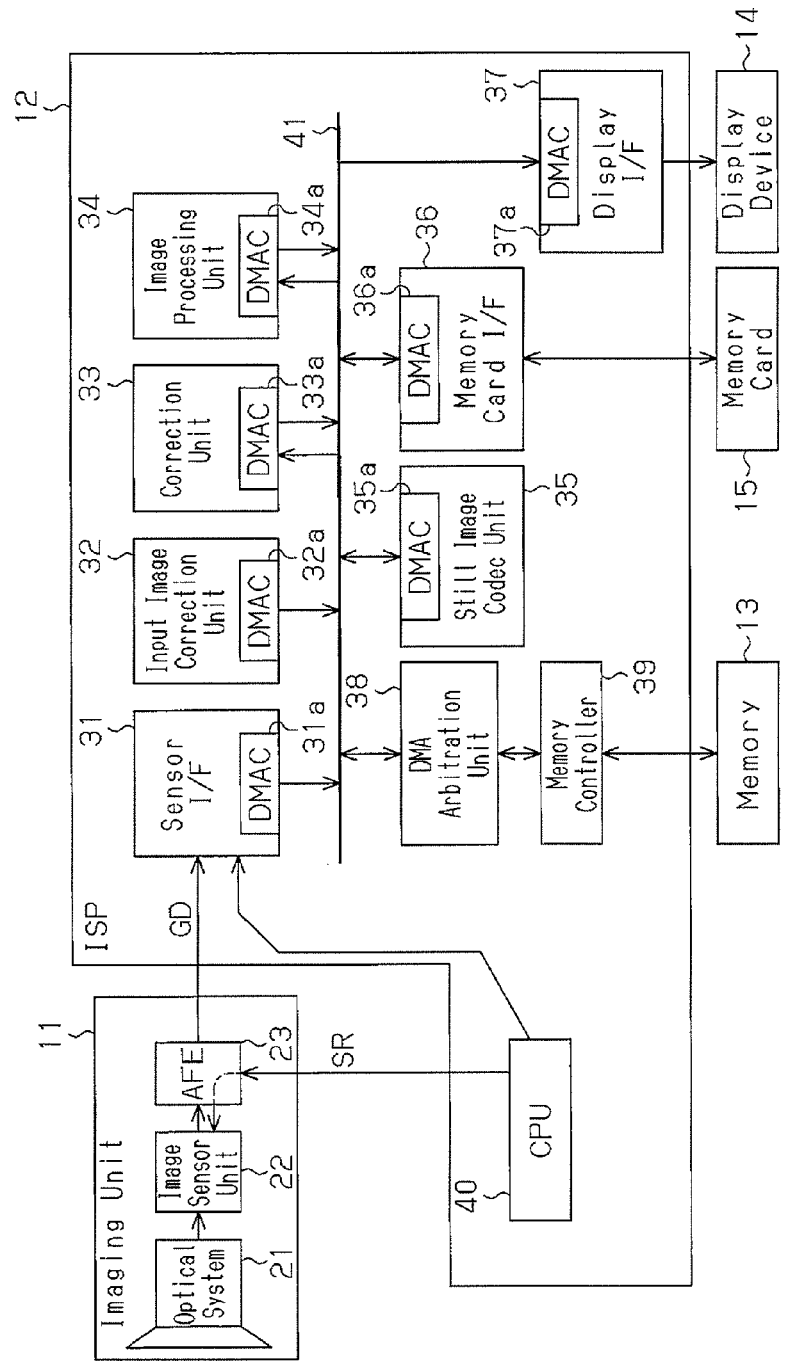
FIG. 1 is a schematic block diagram of an imaging device.

FIG. 1 illustrates an imaging device that is a digital still camera or the like. The imaging device includes an imaging unit 11, an image signal processor (ISP) 12, a memory 13, and a display device 14.

The imaging unit 11 includes an imaging optical system 21, an image sensor unit 22, and an analog front end (AFE) 23. The imaging optical system 21 includes a plurality of lenses (such as a focusing lens) which focuses light from a subject, and a diaphragm which adjusts the amount of light having passed through the lenses. The imaging optical system 21 guides an optical image of the subject to the image sensor unit 22. For example, the image sensor unit 22 includes a Bayer array color filter and a plurality of imaging elements. Each imaging element is a charge coupled device (CCD) image sensor. Each imaging element outputs an imaging signal (analog signal) corresponding to the amount of light received via the color filter. The AFE 23 converts the imaging signal received from the image sensor unit 22 from analog to digital to create captured data, and outputs the captured data. The AFE 23 supplies a control signal SR supplied from the image signal processor 12 to the image sensor unit 22 in accordance with a synchronizing signal. The synchronizing signal includes a vertical synchronizing signal representing a separator of a single field and a horizontal synchronizing signal representing a separator of a single line.

The image signal processor 12 includes a plurality of processing units 31 to 37, a direct memory access (DMA) arbitration unit 38, a memory controller 39, and a CPU (control unit) 40. For example, the plurality of processing units 31 to 37 may include a sensor interface (sensor I/F) 31, an input image correction unit 32, a correction unit 33, an image processing unit 34, a still image codec unit 35, a memory card interface (memory card I/F) 36, and a display interface (display I/F) 37. The sensor I/F 31, the input image correction unit 32, the correction unit 33, the image processing unit 34, the still image codec unit 35, the memory card I/F 36, the display I/F 37, and the DMA arbitration unit 38 are connected to one another via an internal bus 41.

The DMA arbitration unit 38 is connected to the memory 13 via the memory controller 39. The memory 13 is an example of the first storage unit. For example, the memory 13 is a synchronous dynamic random access memory (SDRAM). The memory 13 stores captured data which is outputted from the imaging unit 11 and routed through the sensor I/F 31. In addition, the memory 13 stores processed image data generated by the processing units 32 to 35.

The sensor I/F 31 receives captured data (RGB-format Bayer data) from the imaging unit 11 and stores the captured data in the memory 13. The input image correction unit 32 performs correction on image data stored in the memory 13 and outputs corrected image data. For example, the correction performed on the image data may be gamma correction which adjusts luminance or contrast, shading correction which adjusts uneven brightness, and the like. The corrected image data generated by the input image correction unit 32 is supplied to one or a plurality of circuits depending on an operating mode of the imaging device. For example, the corrected image data is stored in the memory 13 when the imaging device is in a first operating mode, supplied to the display I/F 37 when the imaging device is in a second operating mode, and supplied to the correction unit 33 when the imaging device is in a third operating mode.

The correction unit 33 performs correction on image data read from the memory 13 or image data supplied from the input image correction unit 32 and stores the corrected image data in the memory 13. For example, correction performed by the correction unit 33 may be a process for correcting image distortion attributable to the imaging optical system 21, color correction such as tone modification based on set parameters, and the like. For example, the image processing unit 34 performs resolution conversion, edge enhancement, denoising, and the like. The image processing unit 34 may include a plurality of image processing units. The still image codec unit 35 reads image data stored in the memory 13, encodes the image data according to a certain method such as joint photographic experts group (JPEG), and stores the encoded image data (coded data) in the memory 13.

The processing units 31 to 35 are non-restrictive examples and may be modified as appropriate.

The memory card I/F 36 is connected to a detachable memory card 15 that is mounted to the imaging device. The memory card I/F 36 stores data (for example, compressed image data) stored in the memory 13 in the memory card 15. The display I/F 37 is connected to the display device 14. For example, the display device 14 is a liquid crystal display (LCD). The display device 14 displays an image to be photographed (photographic frame), displays a photographed image, displays remaining battery level of the imaging device and a photography mode, and the like. For example, the display I/F 37 reads image data stored in the memory 13 and outputs the image data to the display device 14. The display device 14 may be an electronic view finder (EVF) or an interface for connecting the image signal processor 12 to an external monitor (for example, a high-definition multimedia interface (HDMI)).

The sensor I/F 31, the input image correction unit 32, the correction unit 33, the image processing unit 34, the still image codec unit 35, the memory card I/F 36, and the display I/F 37 respectively include direct memory access controllers (DMACs) 31a to 37a. The DMACs 31a to 37a output access requests in accordance with processes performed by corresponding circuits 31 to 37. For example, in order for the sensor I/F 31 to store captured data outputted from the imaging unit 11 in the memory 13, the DMAC 31a provided in the sensor I/F 31 outputs a write request. In order for the display I/F 37 to read image data to be displayed on the display device 14 from the memory 13, the DMAC 37a provided in the display I/F 37 outputs a read request. The respective DMACs 31a to 37a are examples of transfer control circuits.

For example, the DMA arbitration unit 38 arbitrates mutually conflicting requests outputted from the DMACs 31a to 37a of the circuits 31 to 37 according to priorities respectively set to the processing units 31 to 37, and permits one of the circuits 31 to 37 to access the memory 13. The circuit with the access permission outputs a control signal for accessing the memory 13. When the control signal is a read request, the memory controller 39 reads data from the memory 13 and outputs the read data to the request source in accordance with the control signal. The memory controller 39 outputs a write request and the data outputted from the source of the write request to the memory 13, and the memory 13 stores the data.

The CPU 40 integrally controls the entire image signal processor 12. The CPU 40 controls setting of information necessary for processes to the respective processing units, writing of data, reading of data, and the like. The CPU 40 sets operating modes and various parameters according to operation signals from an operating unit (not illustrated).

Next, a flow of image data will be described.

Figure 2:
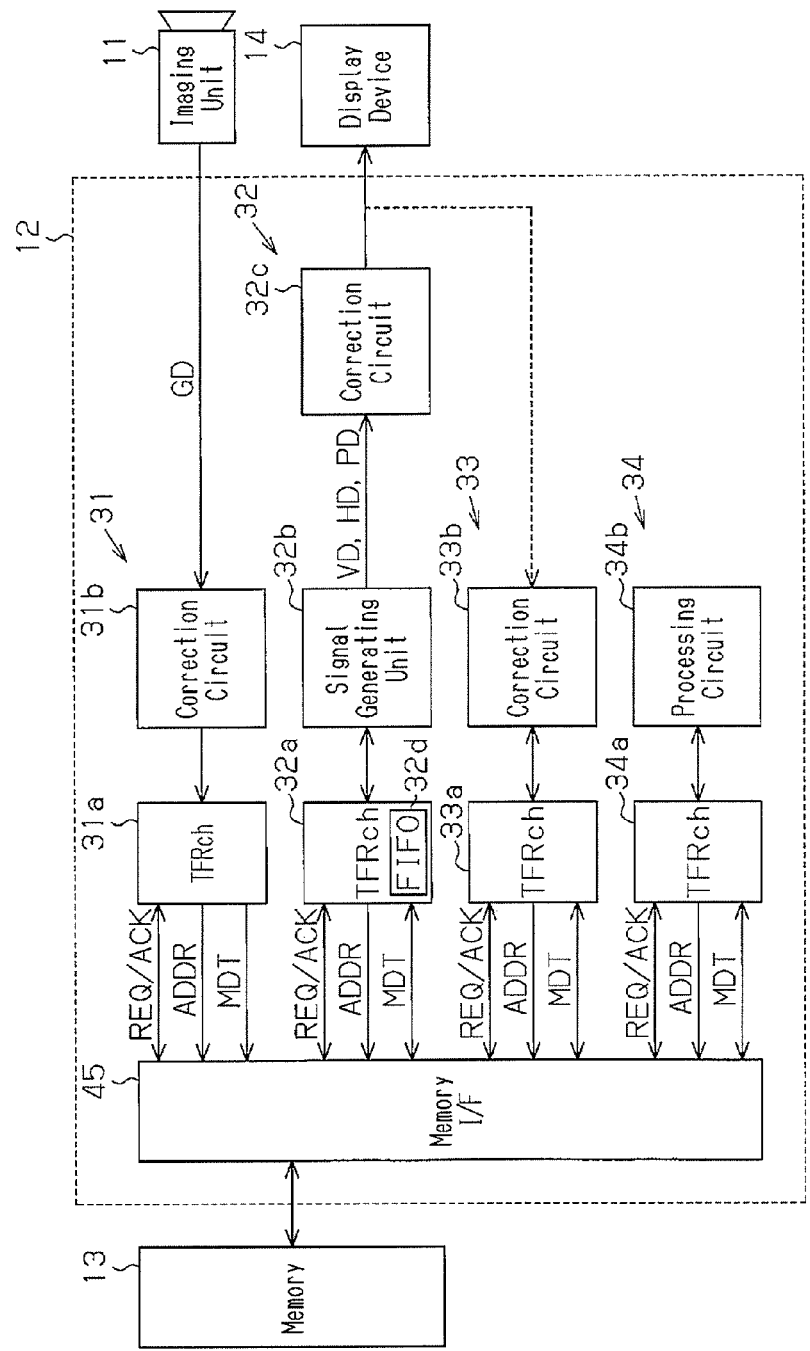
FIG. 2 is a partial block diagram of an image signal processor.

As illustrated in FIG. 2, the image signal processor 12 receives image data GD outputted from the imaging unit 11. The image data GD is stored in the memory 13 via the correction circuit 31b and the transfer control circuit (TFRch) 31a included in the sensor I/F 31 and via the memory interface (memory I/F) 45. The correction circuit 31b performs certain correction on the image data GD. For example, the correction may be white balance adjustment, gain adjustment, defect signal correction, or the like. The transfer control circuit 31a corresponds to the DMAC 31a illustrated in FIG. 1. The memory I/F 45 corresponds to the DMA arbitration unit 38 and the memory controller 39 illustrated in FIG. 1. The transfer control circuit 31a outputs a request signal REQ to write to the memory 13. The memory I/F 45 outputs a memory access permission signal ACK. The transfer control circuit 31a outputs an address signal ADDR indicating an area to which image data is to be written and image data MDT. The address signal ADDR and the image data MDT are supplied to the memory 13 via the memory I/F 45. The image data MDT is stored in a storage area of the memory 13 which corresponds to the address signal ADDR.

The input image correction unit 32 includes a transfer control circuit 32a, a signal generating unit 32b, and a correction circuit 32c. The transfer control circuit 32a outputs a request signal REQ for reading image data from the memory 13 in response to a correction start signal. The memory I/F 45 outputs a memory access permission signal ACK. The transfer control circuit 32a outputs an address signal ADDR which indicates an area from which image data is to be read. The memory 13 outputs data MDT stored in the storage area of the memory 13 corresponding to the address signal ADDR. The data MDT outputted from the memory 13 is supplied to the transfer control circuit 32a via the memory I/F 45.

The transfer control circuit 32a outputs image data to the signal generating unit 32b in response to the data request by the signal generating unit 32b. The signal generating unit 32b outputs synchronizing signals VD and HD and image data PD to the correction circuit 32c. The transfer control circuit 32a and the signal generating unit 32b are examples of a data transfer unit or a data transfer device. The correction circuit 32c receives the image data PD in accordance with the synchronizing signals VD and HD, performs correction on the image data PD, and generates corrected image data. The corrected image data is supplied to the display device 14. The corrected image data may be also stored in the memory 13 in one operating mode and stored in the correction circuit 33b of the correction unit 33 as depicted by the dashed line in another operating mode.

As described above, the image signal processor 12 temporarily stores image data received from the imaging unit 11 in the external memory 13 and reacquires the image data from the memory 13. The image signal processor 12 performs a process (a first process) on the image data read from the memory 13 and stores the processed image data in the memory 13. Subsequently, when another process (a second process) is requested, the image signal processor 12 reacquires the processed image data from the memory 13. In the following description, a process for reacquiring image data from the external memory 13 may be referred to as a re-input process.

The correction unit 33 includes a transfer control circuit 33a and a correction circuit 33b. In a similar manner to the transfer control circuits 31a and 32a, the transfer control circuit 33a exchanges various signals with the memory I/F 45 and accesses the memory 13. The correction circuit 33b performs correction on image data read from the memory 13 or image data supplied from the correction circuit 32c and stores the corrected image data in the memory 13. The image processing unit 34 includes a transfer control circuit 34a and a processing circuit 34b. In a similar manner to the transfer control circuits 31a and 32a, the transfer control circuit 34a exchanges various signals with the memory I/F 45 and accesses the memory 13. The processing circuit 34b performs one or a plurality of processes on the image data read from the memory 13 and stores the processed image data in the memory 13.

The image data PD outputted from the signal generating unit 32b includes image data read from the memory 13 and blank data added to the image data by the signal generating unit 32b. For example, the blank data is used by the correction circuit 32c to perform correction.

Image data GD and PD will now be described.

Figure 3A:
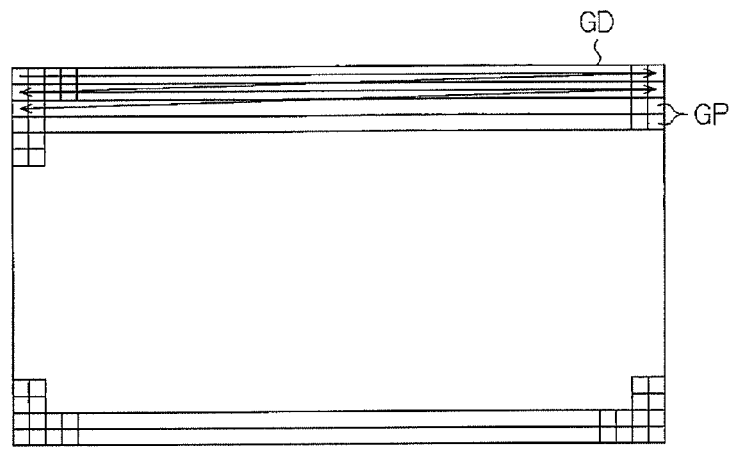
FIG. 3A is a schematic view of an output image of an imaging unit.
Figure 3B:
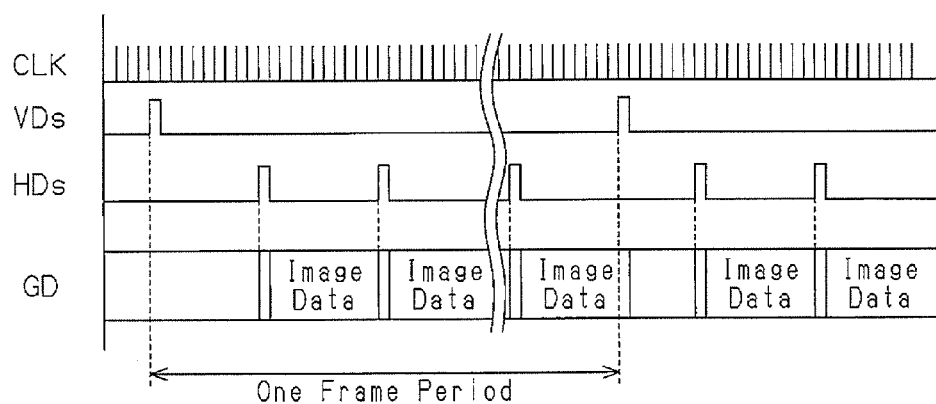
FIG. 3B is a timing diagram illustrating output of the imaging unit.

As illustrated in FIG. 3A, the image data GD includes a plurality of pieces of pixel data GP. The plurality of pieces of pixel data GP respectively corresponds to the plurality of imaging elements that constitutes the image sensor unit 22 of the imaging unit 11 illustrated in FIG. 1. The imaging unit 11 outputs pixel data GP corresponding to analog signals of the plurality of imaging elements in a sequence depicted by arrows in FIG. 3A in accordance with an arrangement of the imaging elements. In doing so, as illustrated in FIG. 3B, the imaging unit 11 outputs the image data GD at timings in accordance with a clock signal CLK, vertical synchronizing signals VDs, and horizontal synchronizing signals HDs. One cycle of the vertical synchronizing signals VDs is a period in which image data GD of one frame (one screen) is outputted, and one cycle of the horizontal synchronizing signals HDs is a period in which one line of image data GD is outputted.

Figure 4A:
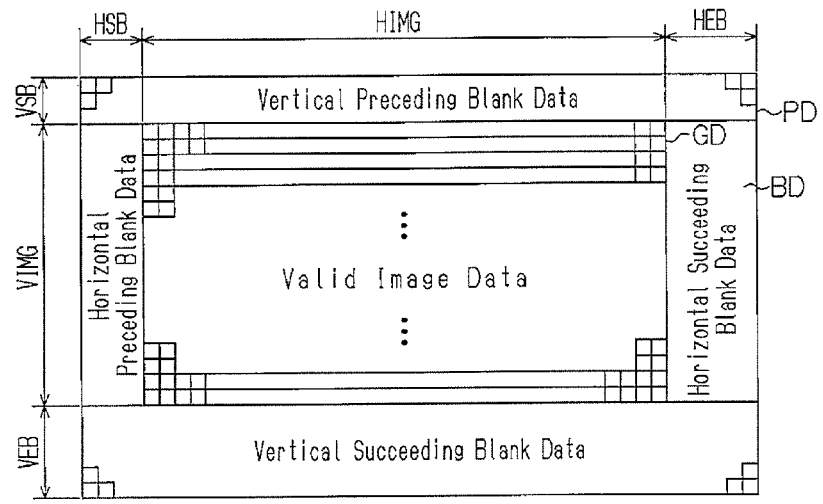
FIG. 4A is an explanatory diagram of re-input data.

As illustrated in FIG. 4A, image data PD includes image data GD of one frame and blank data BD. The image data GD may correspond to a valid image. A horizontal image size HIMG indicates the number of pieces of data in the image data GD in a horizontal direction. A vertical image size VIMG indicates the number of pieces of data in the image data GD in a vertical direction or, in other words, the number of lines in the image data GD.

Figure 4B:
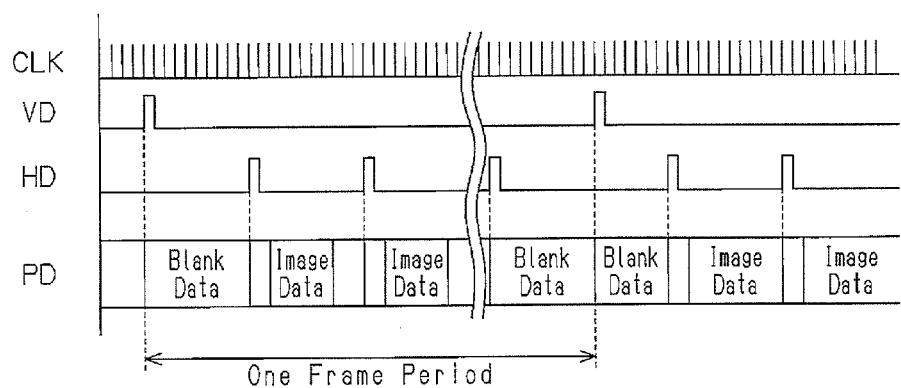
FIG. 4B is a timing diagram illustrating transfer of re-input data.

As illustrated in FIG. 4B, the signal generating unit 32b (FIG. 2) outputs blank data and image data in accordance with a clock signal CLK, a vertical synchronizing signal VD, and a horizontal synchronizing signal HD. As illustrated in FIG. 4A, the blank data BD includes vertical preceding blank data VSB that is outputted before line data including a first line of the image data GD, vertical subsequent blank data VEB that is outputted after line data including a final line of the image data GD, horizontal preceding blank data HSB that is outputted before the respective lines of the image data GD, and horizontal subsequent blank data HEB that is outputted after the respective lines of the image data GD. As illustrated in FIG. 4A, when the image data PD is two-dimensionally arranged (in a matrix pattern) in an output sequence in accordance with synchronizing signals VD and HD, the blank data BD is arranged on a circumference of the image data GD.

In the following description, a size (for example, the number of pixels or the number of lines) of an area corresponding to each piece of blank data VSB, VEB, HSB, and HEB may be referred to as a blank size. For example, the number of lines or, in other words, the number of pieces of data in the vertical direction in the vertical preceding blank data VSB is referred to as a vertical preceding blank size VSB and the number of lines in the vertical subsequent blank data VEB is referred to as a vertical subsequent blank size VEB. The numbers of pieces of data in the horizontal preceding blank data HSB and the horizontal subsequent blank data HEB of each line will be respectively referred to as a horizontal preceding blank size HSB and horizontal subsequent blank size HEB.

A structure of the image data GD illustrated in FIG. 3A may not always be adequate for the correction performed by the correction circuit 32c (FIG. 2). For example, when performing correction on one piece of pixel data, the correction circuit 32c requires the one piece of pixel data that is the correction object as well as a plurality of pieces of pixel data surrounding the one piece of pixel data. Therefore, the correction circuit 32c is unable to perform correction on pixel data on the periphery of the image data GD illustrated in FIG. 3A and, as a result, the number of pieces of pixel data after correction is reduced by the number of pieces of peripheral pixel data. On the other hand, with the structure of the image data PD illustrated in FIG. 4A, the correction circuit 32c is able to perform correction on pixel data on the periphery of the image data GD. As a result, a reduction in the number of pieces of pixel data after correction is prevented. The correction is one of the reasons for adding the blank data BD.

As described above, the plurality of transfer control circuits 31a to 34a accesses the memory 13 via the memory I/F 45. Therefore, transfer of image data to the transfer control circuit 32a is intermittently performed. The signal generating unit 32b sequentially outputs image data PD in accordance with synchronizing signals VD and HD. In other words, a transfer timing of image data from the memory 13 to the transfer control circuit 32a differs from a timing at which the signal generating unit 32b requests image data. Therefore, the transfer control circuit 32a includes a first-in-first-out (FIFO) memory 32d which temporarily stores image data. The transfer control circuit 32a stores image data transferred from the memory 13 in the FIFO memory 32d. The transfer control circuit 32a outputs image data in the FIFO memory 32d in accordance with a data request made by the signal generating unit 32b. The FIFO memory 32d is an example of the second storage unit.

Next, the transfer control circuit 32a and the signal generating unit 32b will be described in detail.

As illustrated in FIG. 5, the signal generating unit 32b includes a blank control unit (denoted by "BLNK Ctrl") 51, a horizontal synchronizing signal generating unit (denoted by "HD Gen") 52, a vertical synchronizing signal generating unit (denoted by "VD Gen") 53, and an output data generating unit (denoted by "IMG Gen") 54.

The transfer control circuit 32a starts processing in response to a start signal OPEN. First, the transfer control circuit 32a outputs a request signal REQ. Upon receiving a memory access permission signal ACK from the memory I/F 45 illustrated in FIG. 2, the transfer control circuit 32a outputs an address signal ADDR. The transfer control circuit 32a receives image data MDT outputted from the memory 13 via the memory I/F 45 and stores the image data MDT in the FIFO memory 32d. The transfer control circuit 32a reads image data RDT from the FIFO memory 32d in response to a data request signal DTEN supplied from the output data generating unit 54, and outputs the image data RDT to the output data generating unit 54 in accordance with a clock signal CLK. In this manner, the transfer control circuit 32a transfers image data stored in the memory 13 illustrated in FIG. 2 to the output data generating unit 54. After transferring the number of pieces of image data corresponding to the horizontal image size HIMG and the vertical image size VIMG stored in a register 32e, the transfer control circuit 32a ends processing on image data of one frame.

The transfer control circuit 32a outputs a memory state signal FST corresponding to a state of the FIFO memory 32d. The FIFO memory 32d stores the input data MDT at a position (address) indicated by a write pointer WP and updates the write pointer WP. The FIFO memory 32d outputs data RDT at a position (address) indicated by a read pointer RP and updates the read pointer RP. Updating the pointers WP and RP means changing the pointers WP and RP to a value indicating a position where a next piece of data is to be written or a position where a next piece of data is to be read. The data RDT is an example of first output data. When sequentially writing or reading data, the FIFO memory 32d adopts values obtained by adding a certain value (for example, "1") to the pointers WP and RP as updated pointers WP and RP.

The FIFO memory 32d cyclically manages the write pointer WP and the read pointer RP. For example, the FIFO memory 32d stores one piece of input data MDT at a position indicated by the write pointer WP and updates (+1) the write pointer WP. When the write pointer WP equals or exceeds a value n (for example, 512) corresponding to memory capacity, the FIFO memory 32d resets (=0) the value of the write pointer WP. In this manner, the FIFO memory 32d cycles the write pointer WP by a value (for example, 0 to 511) corresponding to memory capacity.

In a similar manner, the FIFO memory 32d outputs data RDT at a position indicated by the read pointer RP, and updates the read pointer RP so that the read pointer RP indicates a position of a next piece of readout data (for example, by adding "+1" to the read pointer RP). When the read pointer RP reaches a value (for example, 512) corresponding to the memory capacity, the FIFO memory 32d resets (=0) the value of the read pointer RP. In this manner, the FIFO memory 32d cycles the read pointer RP by a value (for example, 0 to 511) corresponding to the memory capacity.

Based on the write pointer WP and the read pointer RP, the transfer control circuit 32a monitors the amount of data stored in the FIFO memory 32d and controls writing of data to the FIFO memory 32d. The transfer control circuit 32a outputs a memory state signal FST corresponding to the amount of stored data in the FIFO memory 32d.

Based on the write pointer WP and the read pointer RP, the transfer control circuit 32a calculates the number of pieces of data MNM stored in the FIFO memory 32d. The number of pieces of data MNM is the number of pieces of unread data among the data stored in the FIFO memory 32d. Based on a storage capacity MMX of the FIFO memory 32d and the number of pieces of data MNM, the transfer control circuit 32a calculates an available capacity MEP (=storage capacity MMX—the number of pieces of data MNM). The transfer control circuit 32a compares the available capacity MEP with the number of pieces of data that is transferred to the transfer control circuit 32a from the memory 13 in response to one request signal REQ (burst transfer amount). When the available capacity MEP is equal to or greater than the burst transfer amount, the transfer control circuit 32a outputs a request signal REQ to the memory I/F 45 illustrated in FIG. 2.

Based on the storage capacity MMX and the number of pieces of data MNM in the FIFO memory 32d, the transfer control circuit 32a calculates data storage efficiency MRT. The data storage efficiency MRT is a proportion (percentage: %) of the number of pieces of data MNM to the available capacity MEP. The data storage efficiency MRT represents a storage state of data in the FIFO memory 32d. The transfer control circuit 32a outputs a memory state signal FST based on the data storage efficiency MRT.

For example, when the data storage efficiency MRT is lower than 20%, the FIFO memory 32d is in an approximately empty state (EMPTY). When the data storage efficiency MRT is equal to or higher than 20% and lower than 80%, the FIFO memory 32d is in a somewhat full state (MODERATE). When the data storage efficiency MRT is equal to or higher than 80%, the FIFO memory 32d is in an approximately full state (FULL). The transfer control circuit 32a outputs memory state signals FST which distinguish and indicate the three states. For example, the transfer control circuit 32a outputs a memory state signal FST having a value "0" representing a first state (EMPTY), a memory state signal FST having a value "1" representing a second state (MODERATE), and a memory state signal FST having a value "2" representing a third state (FULL). The values of the data storage efficiency MRT and the values of the memory state signals FST are exemplary and may be modified as appropriate.

The register 32e stores various parameters related to operations of the transfer control circuit 32a and the signal generating unit 32b. The various parameters include the various sizes (HIMG, VIMG, VSB, VEB, HSB, and HEB) described above and an inter-synchronizing signal blank size VHB. The inter-synchronizing signal blank size VHB represents the number of pieces of blank data that is transferred between a vertical synchronizing signal VD and a first-line horizontal synchronizing signal HD.

The blank control unit 51 starts processing in response to the start signal OPEN. The blank control unit 51 receives the clock signal CLK, the memory state signal FST outputted from the transfer control circuit 32a, the vertical preceding blank size VSB, the vertical succeeding blank size VEB, the horizontal preceding blank size HSB, and the horizontal succeeding blank size HEB stored in the register 32e, a horizontal count value HCNT outputted from the horizontal synchronizing signal generating unit 52, and a vertical count value VCNT outputted from the vertical synchronizing signal generating unit 53. The blank control unit 51 generates and outputs a blank addition signal BAD and a blank deletion signal BSK based on the memory state signal FST, the vertical preceding blank size VSB, the vertical succeeding blank size VEB, the horizontal preceding blank size HSB, the horizontal succeeding blank size HEB, the horizontal count value HCNT, and the vertical count value VCNT.

The horizontal synchronizing signal generating unit 52 starts processing in response to the start signal OPEN. The horizontal synchronizing signal generating unit 52 receives the horizontal preceding blank size HSB, the horizontal succeeding blank size HEB, the inter-synchronizing signal blank size VHB, and the horizontal image size HIMG stored in the register 32e. The horizontal synchronizing signal generating unit 52 receives the clock signal CLK, the blank addition signal BAD and the blank deletion signal BSK outputted from the blank control unit 51, the vertical synchronizing signal VD outputted from the vertical synchronizing signal generating unit 53, and the output data PD outputted from the output data generating unit 54. The horizontal synchronizing signal generating unit 52 outputs a horizontal synchronizing signal HD in accordance with the clock signal CLK and at a timing based on the horizontal preceding blank size HSB, the horizontal succeeding blank size HEB, the inter-synchronizing signal blank size VHB, the horizontal image size HIMG, the blank addition signal BAD, the blank deletion signal BSK, and the vertical synchronizing signal VD. The horizontal synchronizing signal generating unit 52 includes a horizontal counter which counts the number of pieces of output data PD and outputs a count value HCNT of the horizontal counter (also referred to as a horizontal count value). The horizontal synchronizing signal generating unit 52 presets the horizontal count value HCNT to a certain value (for example, "1") in response to the vertical synchronizing signal VD and the horizontal synchronizing signal HD.

The vertical synchronizing signal generating unit 53 starts processing in response to the start signal OPEN. The vertical synchronizing signal generating unit 53 receives the vertical preceding blank size VSB, the vertical succeeding blank size VEB, and the vertical image size VIMG stored in the register 32e. The vertical synchronizing signal generating unit 53 receives the clock signal CLK, and the horizontal synchronizing signal HD and the horizontal count value HCNT outputted from the horizontal synchronizing signal generating unit 52. The vertical synchronizing signal generating unit 53 outputs the vertical synchronizing signal VD in accordance with the clock signal CLK and at a timing based on the vertical preceding blank size VSB, the vertical succeeding blank size VEB, the vertical image size VIMG, the horizontal synchronizing signal HD, and the horizontal count value HCNT. The vertical synchronizing signal generating unit 53 includes a vertical counter which counts the horizontal synchronizing signal HD and outputs a count value VCNT of the vertical counter (also referred to as a vertical count value). The vertical synchronizing signal generating unit 53 presets the vertical count value VCNT to a certain value (for example, "0") in response to the vertical synchronizing signal VD.

The output data generating unit 54 supplies the data request signal DTEN to the transfer control circuit 32a and receives the image data RDT outputted from the transfer control circuit 32a. The output data generating unit 54 receives the vertical preceding blank size VSB, the vertical image size VIMG, the horizontal preceding blank size HSB, and the horizontal image size HIMG stored in the register 32e. The output data generating unit 54 receives the vertical synchronizing signal VD and the vertical count value VCNT outputted from the vertical synchronizing signal generating unit 53 and the horizontal synchronizing signal HD and the horizontal count value HCNT outputted from the horizontal synchronizing signal generating unit 52. The output data generating unit 54 outputs the image data PD based on the vertical preceding blank size VSB, the vertical image size VIMG, the horizontal preceding blank size HSB, the horizontal image size HIMG, the vertical synchronizing signal VD, the vertical count value VCNT, the horizontal synchronizing signal HD, and the horizontal count value HCNT. The image data PD includes the image data RDT supplied from the transfer control circuit 32a and the blank data BD.

Next, processes performed by the blank control unit 51 will be described with reference to FIGS. 6 to 10.

Figure 6:
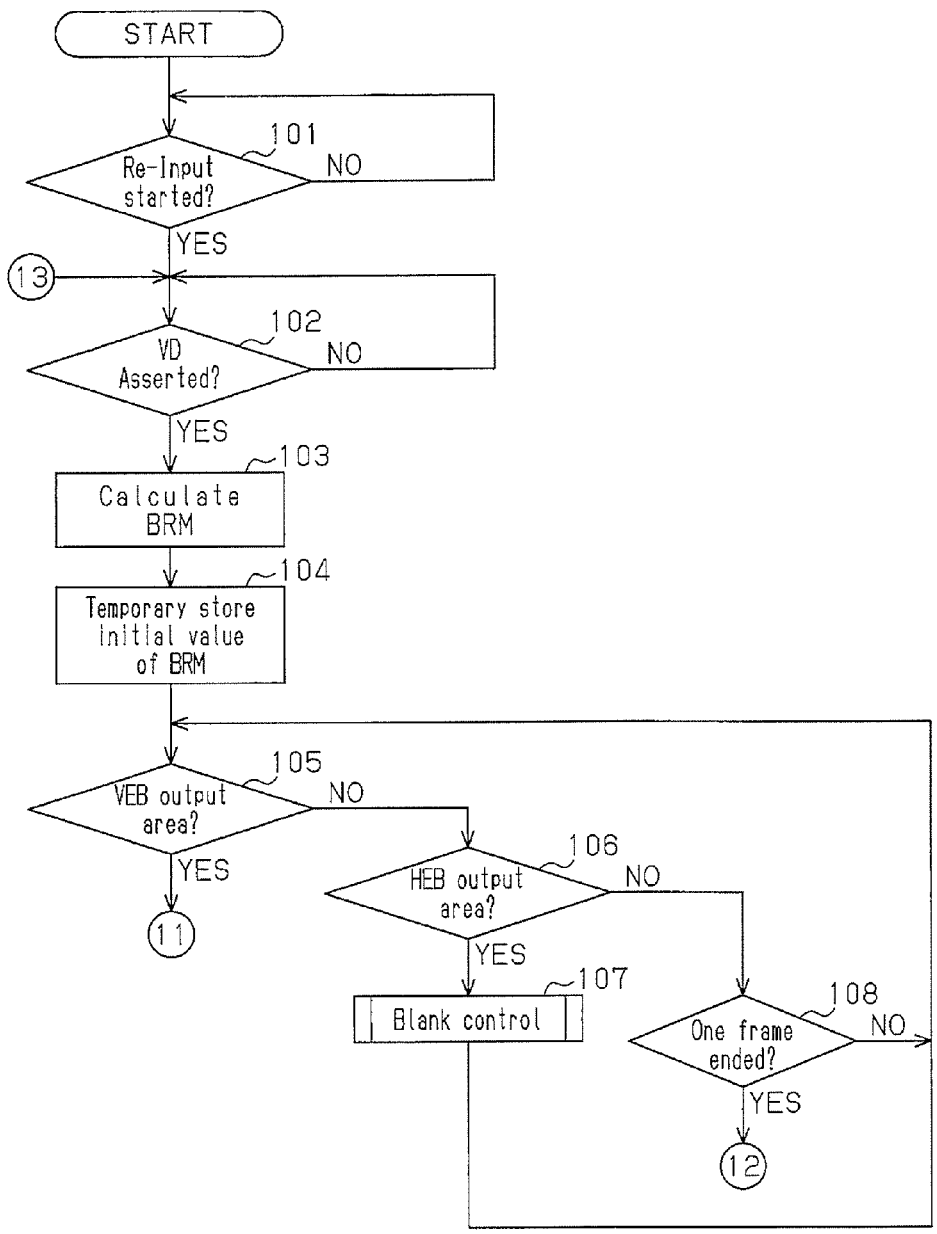
FIGS. 6 to 10 are flow charts illustrating processes performed by a blank control unit.

As illustrated in FIG. 6, first, in block 101, the blank control unit 51 determines whether or not re-input has started. For example, an H-level start signal OPEN indicates start of re-input. When the start signal OPEN is at an L-level, the blank control unit 51 determines that re-input has not started (NO in block 101) and stands by (loop in block 101). When the start signal OPEN is at the H-level, the blank control unit 51 determines that re-input has started (YES in block 101).

Next, in block 102, the blank control unit 51 determines whether or not the vertical synchronizing signal VD has been asserted (for example, at the H-level). For example, when the vertical synchronizing signal VD has not been asserted (NO in block 102), the blank control unit 51 stands by. When the vertical synchronizing signal VD is asserted, in block 103, the blank control unit 51 calculates the total number of pieces of adjustable blank data BRM. The total number of pieces of blank data BRM is a sum of the number of pieces of data of the horizontal succeeding blank data HEB and the number of pieces of data of the vertical succeeding blank data VEB in the image data PD illustrated in FIG. 4A. Transfer of the image data GD is completed within a certain period (for example, one vertical scanning period from the assertion of one vertical synchronizing signal VD to the assertion of a next vertical synchronizing signal VD). The vertical preceding blank data VSB is necessary for determining whether or not each piece of line data in the image data PD of one frame is line data including the image data GD. The horizontal preceding blank data HSB is necessary for determining a start of the image data GD in data of each line. On the other hand, in each piece of line data, the number of pieces of blank data may be modified from the moment transfer of the image data GD ends until the next horizontal synchronizing signal HD is received. In a similar manner, in the image data PD of one frame, the number of pieces of blank data may be modified from the moment transfer of the image data GD ends until the next vertical synchronizing signal VD is received. The horizontal succeeding blank data HEB and the vertical succeeding blank data VEB are adjustable blank data whose size is changeable. The total number of pieces of blank data BRM may be calculated according to the following equation.

$$BRM = HEB \times VIMG + (HSB + HIMG + HEB) \times VEB$$

In block 104, the blank control unit 51 stores the total number of pieces of blank data BRM calculated in block 103 as an initial value IBRM in, for example, the register 32e.

Next, in block 105, the blank control unit 51 determines whether or not a VEB output area or, in other words, the vertical succeeding blank data VEB is currently being outputted. When the vertical succeeding blank data VEB is not being outputted (NO in block 105), the blank control unit 51 executes block 106, and when the vertical succeeding blank data VEB is being outputted (YES in block 105), the blank control unit 51 executes block 109 illustrated in FIG. 7.

In block 106 illustrated in FIG. 6, the blank control unit 51 determines whether or not an HEB output area or, in other words, whether or not the horizontal succeeding blank data HEB is currently being outputted. When the horizontal succeeding blank data HEB is being outputted (YES in block 106), the blank control unit 51 executes a blank control process in block 107. Details of block 107 will be given later. After the process of block 107, the blank control unit 51 returns to block 105. When the horizontal succeeding blank data HEB is not being outputted (NO in block 106), in block 108, the blank control unit 51 determines whether or not processing of one frame has been ended. For example, the blank control unit 51 compares the vertical count value VCNT with a size of the image data PD in the vertical direction (=VSB+VIMG+VEB), and determines that the processing of one frame has not been ended when the vertical count value VCNT is smaller than the vertical size (NO in block 108). On the other hand, when the vertical count value VCNT is equal to the vertical size, the blank control unit 51 determines that the processing of one frame has been ended (determination of YES).

Figure 7:
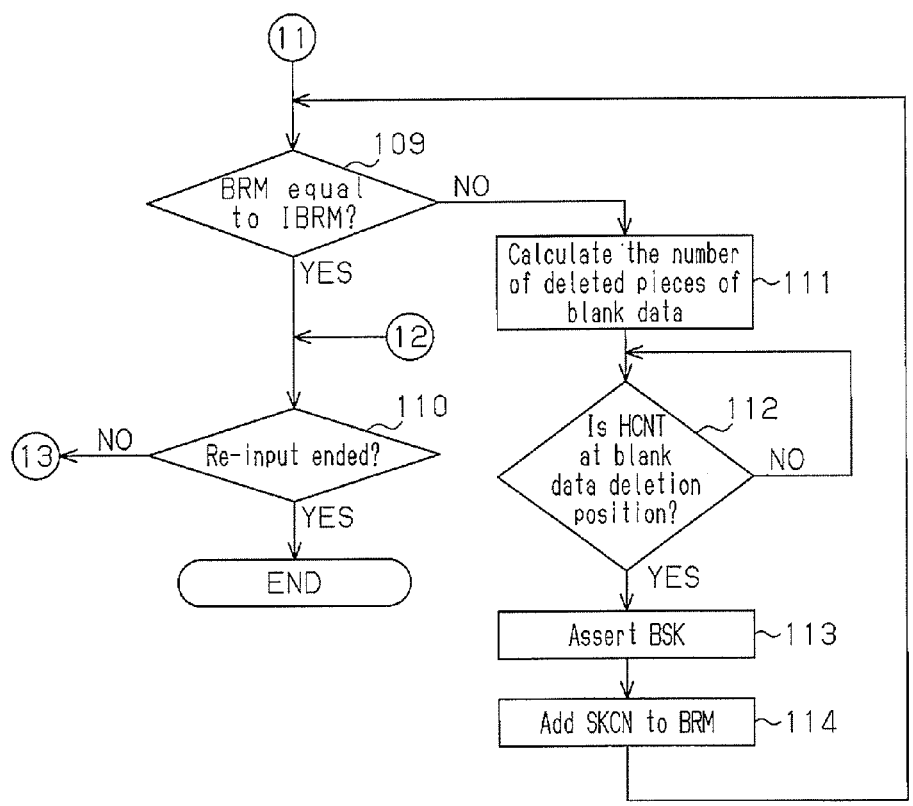

In block 109 illustrated in FIG. 7, the blank control unit 51 determines whether or not the total number of pieces of blank data BRM is equal to the initial value IBRM. When the total number of pieces of blank data BRM is equal to the initial value IBRM (YES in block 109), the blank control unit 51 executes block 110. On the other hand, when the total number of pieces of blank data BRM is not equal to the initial value IBRM (determination of NO), the blank control unit 51 executes block 111.

In block 110, the blank control unit 51 determines whether or not the re-input process has been ended. For example, an L-level start signal OPEN indicates that the process has been ended. Therefore, when the start signal OPEN is at the H-level, the blank control unit 51 determines that the process has not been ended (start of re-input) (NO in block 110) and executes block 102 illustrated in FIG. 6. On the other hand, when the start signal OPEN is at the L-level, the blank control unit 51 determines that the process has been ended (YES in block 110) and terminates the re-input process.

When the total number of pieces of blank data BRM is not equal to the initial value IBRM (NO in block 109), in block 111, the blank control unit 51 calculates the number of deleted pieces of blank data. For example, when outputting vertical succeeding blank data VEB, the blank control unit 51 calculates the number of deleted pieces SKCN of the vertical succeeding blank data VEB according to the following equation.

$$SKCN=\text{roundup}((IBRM-BRM)/(VSB+VIMG+VEB-VCNT+1))$$

In the equation, "roundup" represents a function for rounding up a numerical value obtained by division.

Next, in block 112, the blank control unit 51 determines whether or not the horizontal count value HCNT is at a blank data deletion position. The blank data deletion position corresponds to a value obtained by subtracting the number of deleted pieces SKCN from a standard number of pieces of output data RLN among the number of pieces of data to be included in one line. The standard number of pieces of output data RLN is the number of pieces of data in line data for which the number of pieces of blank data is not adjusted and is a sum of the horizontal preceding blank size HSB, the horizontal image size HIMG, and the horizontal succeeding blank size HEB (=HSB+HIMG+HEB). In other words, the blank control unit 51 compares the horizontal count value HCNT with the blank data deletion position (=(HSB+HIMG+HEB−SKCN)−1). When the horizontal count value HCNT differs from the blank data deletion position (NO in block 112), the blank control unit 51 stands by (loop). On the other hand, when the horizontal count value HCNT is equal to the blank data deletion position (YES in block 112), the blank control unit 51 executes block 113.

In block 113, in order to make a transition to processing of a next line, the blank control unit 51 asserts a blank deletion signal BSK or, in other words, outputs an H-level blank deletion signal BSK. In block 114, the blank control unit 51 adds the calculated number of deleted pieces of blank data to the total number of pieces of blank data BRM (BRM=BRM+SKCN) and subsequently returns to block 109.

Next, blank control in block 107 in FIG. 6 will be described in detail.

Figure 8:
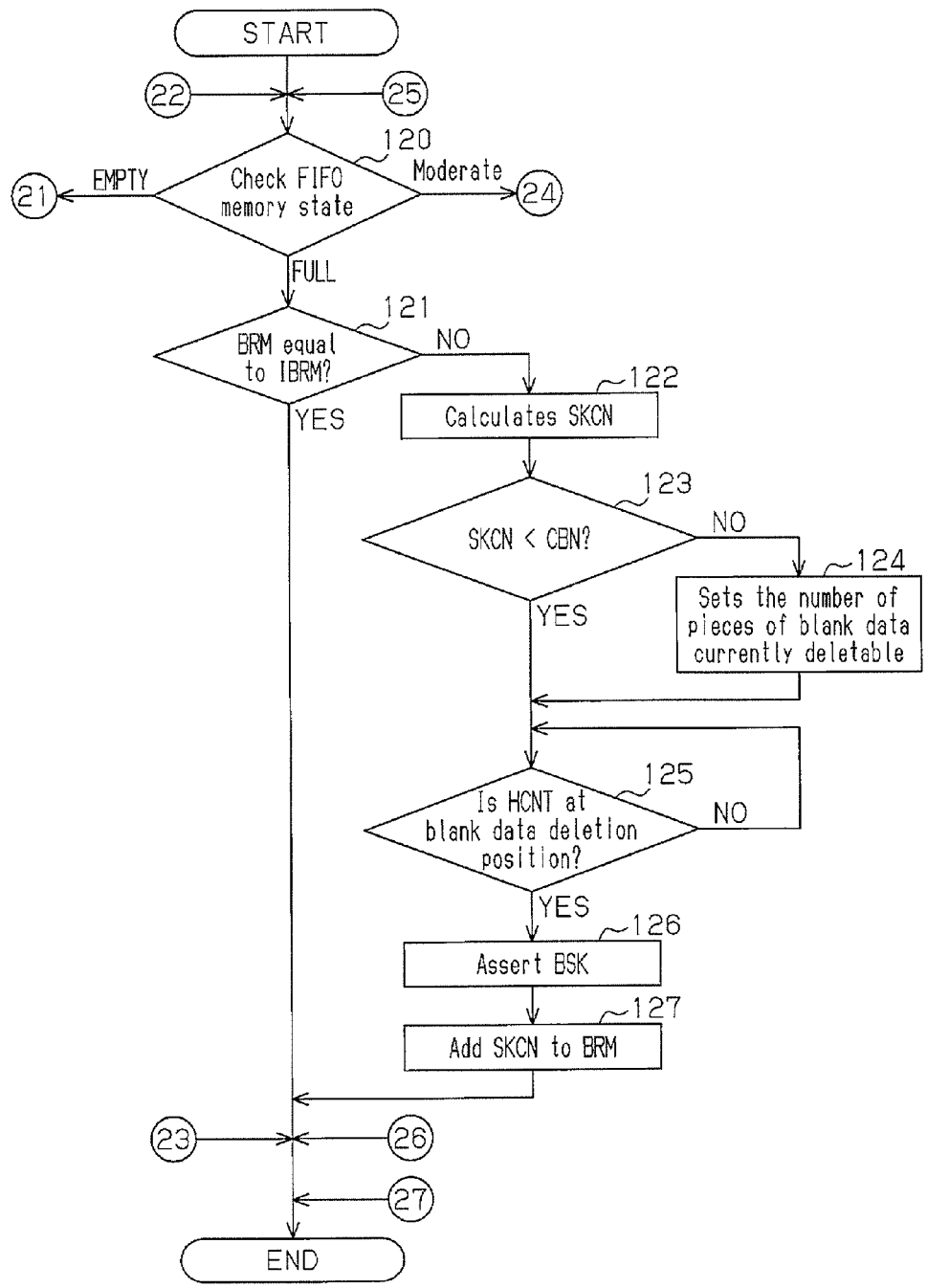

As illustrated in FIG. 8, first, in block 120, the blank control unit 51 checks a data storage state of the FIFO memory 32d. For example, the blank control unit 51 checks a value of the memory state signal FST and executes processes based on the value. For example, when the memory state signal FST indicates a "FULL" state of the FIFO memory 32d, the blank control unit 51 executes block 121. When the memory state signal FST indicates an "EMPTY" state of the FIFO memory 32d, the blank control unit 51 executes block 131 illustrated in FIG. 9. When the memory state signal FST indicates a "MODERATE" state of the FIFO memory 32d, the blank control unit 51 executes block 141 illustrated in FIG. 10.

In block 121, the blank control unit 51 determines whether or not the total number of pieces of blank data BRM is equal to the initial value IBRM. When the total number of pieces of blank data BRM is equal to the initial value IBRM (YES in block 121), the blank control unit 51 ends the processing. On the other hand, when the total number of pieces of blank data BRM differs from the initial value IBRM (NO in block 121), the blank control unit 51 executes block 122.

In block 122, the blank control unit 51 calculates the number of pieces of blank data to be deleted from the total number of pieces of blank data BRM (the number of deleted pieces SKCN). The number of deleted pieces SKCN is obtained by subtracting the total number of pieces of blank data BRM from the initial value IBRM (SKCN=IBRM−BRM).

Next, in block 123, in order to determine which of the values of the number of deleted pieces SKCN and the number of pieces of data CBN is to be adopted, the blank control unit 51 determines whether or not the number of deleted pieces SKCN is smaller than the number of pieces of data CBN of horizontal succeeding blank data HEB that is deletable. The number of pieces of data CBN of horizontal succeeding blank data HEB that is deletable is set in accordance with a value obtained by subtracting the horizontal count value HCNT at the present moment from the standard number of pieces of output data RLN (=HSB+HIMG+HEB). In other words, the number of pieces of data CBN of horizontal succeeding blank data HEB that is deletable corresponds to the number of pieces of data in blank data not yet transferred in one piece of line data at the present moment. In other words, the number of pieces of data CBN may be calculated according to the following equation.

CBN=(HSB+HIMG+HEB−HCNT)−1

In the equation above, "−1" represents an example of a constant for adjusting processing timings. The constant may be determined based on a result of the determination in block 123 and in consideration of the number of pieces of blank data that is transferred until the blank deletion signal BSK is asserted.

When the number of deleted pieces SKCN is smaller than the number of pieces of data CBN (SKCN<CBN) (YES in block 123), the blank control unit 51 executes block 125, and when the number of deleted pieces SKCN is equal to or greater than the number of pieces of data CBN (NO in block 123), the blank control unit 51 executes block 124.

In block 124, the blank control unit 51 sets the number of pieces of blank data that is deletable at the present moments as the number of deleted pieces SKCN. In other words, the blank control unit 51 sets the number of deleted pieces SKCN so as to equal the number of pieces of data CBN in block 123 (SKCN=CBN).

Next, in block 125, the blank control unit 51 determines whether or not the horizontal count value HCNT is at a blank data deletion position. The blank data deletion position corresponds to a value obtained by subtracting the number of deleted pieces SKCN from the standard number of pieces of output data RLN among the number of pieces of data that is transferred in one line. In other words, the blank control unit 51 compares the horizontal count value HCNT with the blank data deletion position (=(HSB+HIMG+HEB−SKCN)−1). When the horizontal count value HCNT differs from the blank data deletion position (NO in block 125), the blank control unit 51 stands by (loop). On the other hand, when the horizontal count value HCNT is equal to the blank data deletion position (YES in block 125), the blank control unit 51 executes block 126.

In block 126, in order to make a transition to processing of a next line, the blank control unit 51 asserts a blank deletion signal BSK or, in other words, outputs an H-level blank deletion signal BSK.

Next, in block 127, the blank control unit 51 adds the number of deleted pieces of blank data to the total number of pieces of blank data BRM (BRM=BRM+SKCN) and subsequently terminates the blank control process.

Figure 9:
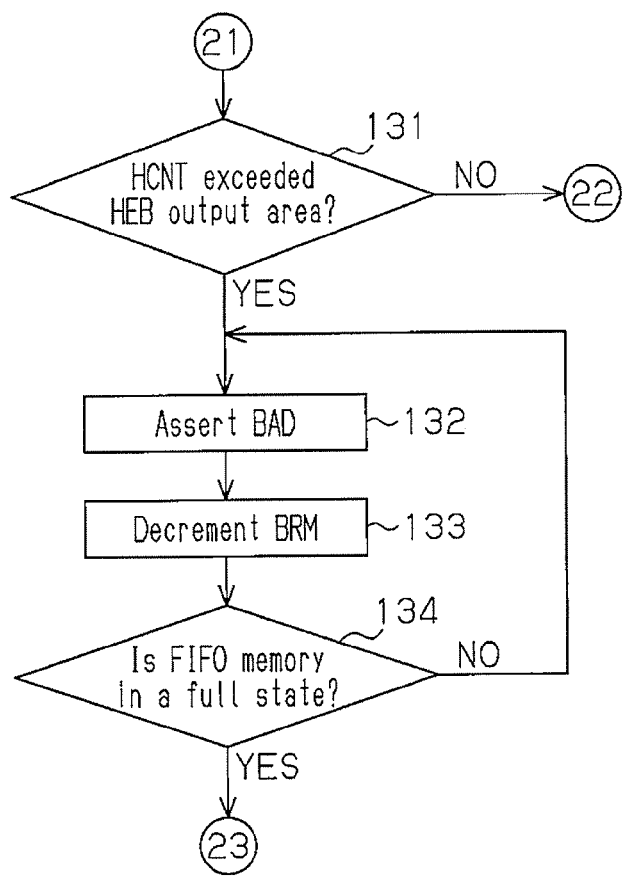

When a transition is made from block 120 in FIG. 8 to block 131 in FIG. 9, in order to determine whether or not the horizontal count value HCNT has exceeded the HEB output area, the blank control unit 51 determines whether or not the horizontal count value HCNT is equal to or greater than the number of pieces of data in lines in which the number of pieces of blank data is not adjusted (the standard number of pieces of output data RLN). When the horizontal count value HCNT is equal to or greater than the standard number of pieces of output data RLN (YES in block 131), the blank control unit 51 executes block 132. When the horizontal count value HCNT is smaller than the standard number of pieces of output data RLN (NO in block 131), the blank control unit 51 executes block 120 illustrated in FIG. 8.

In block 132, in order to add blank data, the blank control unit 51 asserts the blank addition signal BAD (for example, the blank control unit 51 outputs an H-level blank addition signal BAD). In block 133, the blank control unit 51 decrements the total number of pieces of blank data BRM (BRM=BRM−1).

Next, in block 134, based on the memory state signal FST, the blank control unit 51 determines whether or not the FIFO memory 32d is in a "FULL" state. When the FIFO memory 32d is not in a "FULL" state (NO in block 134), the blank control unit 51 executes block 132. On the other hand, when the FIFO memory 32d is in a "FULL" state, the blank control unit 51 terminates the blank control process.

Figure 10:
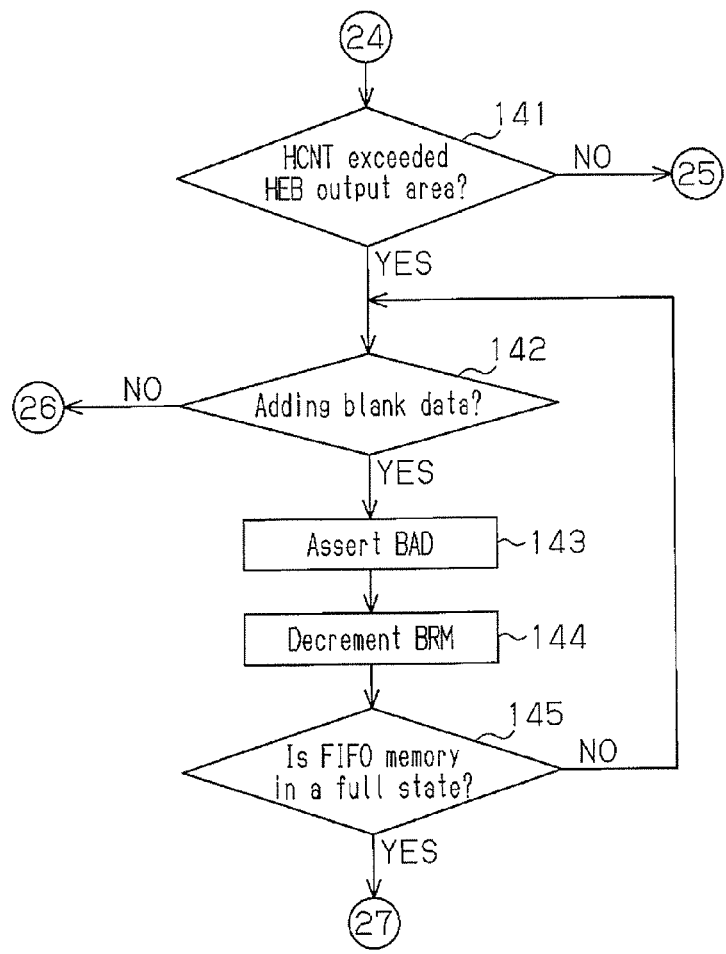

When a transition is made from block 120 in FIG. 8 to block 141 in FIG. 10, in order to determine whether or not the horizontal count value HCNT has exceeded the HEB output area, the blank control unit 51 determines whether or not the horizontal count value HCNT is equal to or greater than the number of pieces of data in lines in which the number of pieces of blank data is not adjusted (the standard number of pieces of output data RLN). When the horizontal count value HCNT is equal to or greater than the standard number of pieces of output data RLN (YES in block 141), the blank control unit 51 executes block 142. When the horizontal count value HCNT is smaller than the standard number of pieces of output data RLN (NO in block 141), the blank control unit 51 executes block 120 illustrated in FIG. 8.

In block 142, the blank control unit 51 determines whether or not the current setting is a setting for adding blank data. For example, the register 32e illustrated in FIG. 5 stores a blank addition mode BLMD set by a user. When the blank addition mode BLMD is set to "1" and the FIFO memory 32d is in a "MODERATE" state, the blank control unit 51 adds blank data using a similar method as in an "EMPTY" state. On the other hand, when the blank addition mode BLMD is set to "0" and the FIFO memory 32d is in a "MODERATE" state, the blank control unit 51 does not add blank data. As described above, when the current setting is a setting for adding blank data (YES in block 142), the blank control unit 51 executes block 143. When the current setting is not a setting for adding blank data (NO in block 142), the blank control unit 51 ends the blank control process.

In block 143, in order to add blank data, the blank control unit 51 asserts the blank addition signal BAD (for example, the blank control unit 51 outputs an H-level blank addition signal BAD). In block 144, the blank control unit 51 decrements the total number of pieces of blank data BRM (BRM=BRM−1).

In block 145, based on the memory state signal FST, the blank control unit 51 determines whether or not the FIFO memory 32d is in a "FULL" state. When the FIFO memory 32d is not in a "FULL" state (NO in block 145), the blank control unit 51 executes block 142. On the other hand, when the FIFO memory 32d is in a "FULL" state, the blank control unit 51 ends the blank control process.

Next, processes performed by the horizontal synchronizing signal generating unit 52 will be described with reference to FIGS. 11 and 12.

Figure 11:
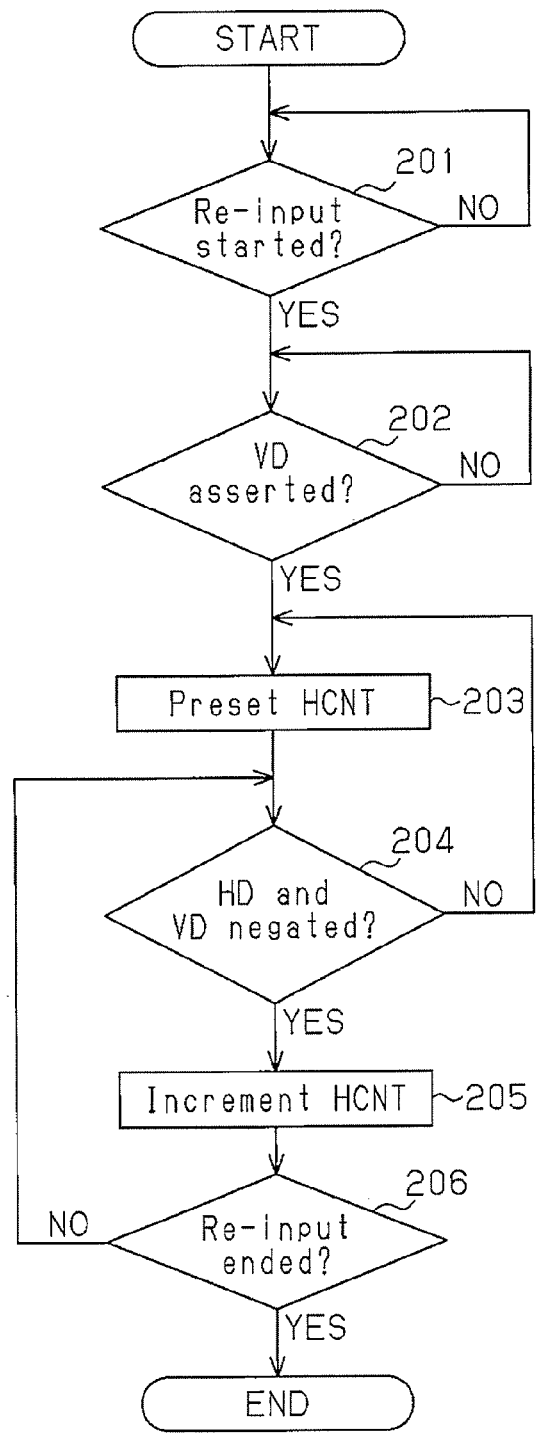
FIGS. 11 and 12 are flow charts illustrating processes performed by a horizontal synchronizing signal generating unit.

FIG. 11 illustrates processes related to the horizontal count value HCNT. First, in block 201, based on the start signal OPEN, the horizontal synchronizing signal generating unit 52 determines whether or not re-input has been started. For example, the horizontal synchronizing signal generating unit 52 determines that re-input has started based on an H-level start signal OPEN (YES in block 201). If not, the horizontal synchronizing signal generating unit 52 determines that re-input has not started (NO in block 201).

Next, in block 202, the horizontal synchronizing signal generating unit 52 determines whether or not the vertical synchronizing signal VD has been asserted (for example, at the H-level). For example, when the vertical synchronizing signal VD has not been asserted (NO in block 202), the horizontal synchronizing signal generating unit 52 stands by until the vertical synchronizing signal VD is asserted. Once the vertical synchronizing signal VD is asserted, in block 203, the horizontal synchronizing signal generating unit 52 presets the horizontal count value HCNT to a certain value (for example, "1").

Next, in block 204, the horizontal synchronizing signal generating unit 52 determines whether or not the horizontal synchronizing signal HD and the vertical synchronizing signal VD have been negated. When at least one of the horizontal synchronizing signal HD and the vertical synchronizing signal VD has been asserted (NO in block 204), the horizontal synchronizing signal generating unit 52 executes block 203, and when the horizontal synchronizing signal HD and the vertical synchronizing signal VD have been negated (YES in block 204), the horizontal synchronizing signal generating unit 52 executes block 205.

In block 205, the horizontal synchronizing signal generating unit 52 increments the horizontal count value HCNT.

Next, in block 206, based on the start signal OPEN, the horizontal synchronizing signal generating unit 52 determines whether or not the re-input process has been ended. For example, when the start signal OPEN is at an H-level, the horizontal synchronizing signal generating unit 52 determines that the process has not been ended (NO in block 206) and executes block 204. On the other hand, when the start signal OPEN is at the L-level, the horizontal synchronizing signal generating unit 52 determines that re-input has been ended (YES in block 206) and terminates the process.

Figure 12:
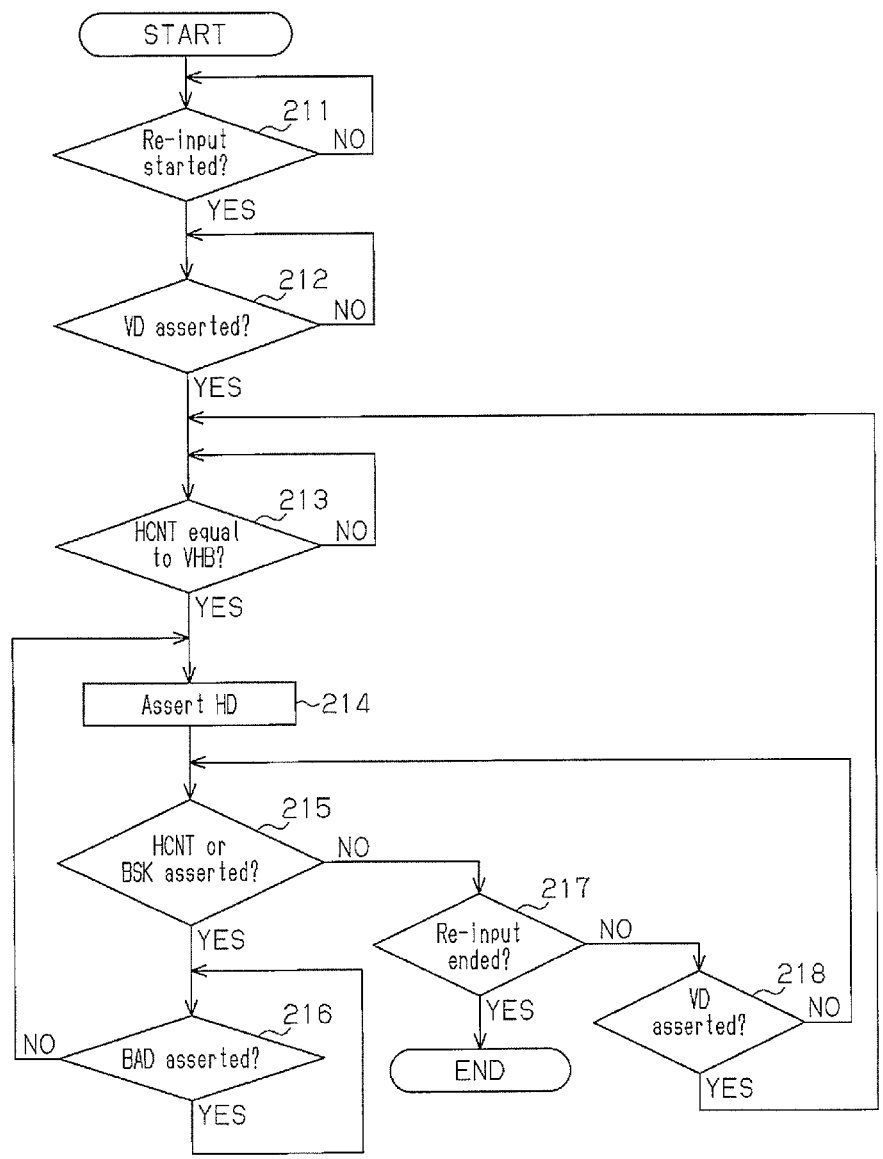

FIG. 12 illustrates processes related to the horizontal synchronizing signal HD.

First, in block 211, based on the start signal OPEN, the horizontal synchronizing signal generating unit 52 determines whether or not re-input has been started. For example, the horizontal synchronizing signal generating unit 52 determines that re-input has started based on an H-level start signal OPEN (YES in block 211). If not, the horizontal synchronizing signal generating unit 52 determines that re-input has not started (NO in block 211).

Next, in block 212, the horizontal synchronizing signal generating unit 52 determines whether or not the vertical synchronizing signal VD has been asserted (for example, at the H-level). For example, when the vertical synchronizing signal VD has not been asserted (NO in block 212), the horizontal synchronizing signal generating unit 52 stands by until the vertical synchronizing signal VD is asserted. Once the vertical synchronizing signal VD is asserted, in block 213, the horizontal synchronizing signal generating unit 52 determines whether or not the horizontal count value HCNT is equal to the inter-synchronizing signal blank size VHB. If not equal (NO in block 213), the horizontal synchronizing signal generating unit 52 stands by. If equal (YES in block 213), in block 214, the horizontal synchronizing signal generating unit 52 asserts the horizontal synchronizing signal HD. For example, the horizontal synchronizing signal generating unit 52 outputs an H-level horizontal synchronizing signal HD as pulses.

Next, in block 215, the horizontal synchronizing signal generating unit 52 determines the horizontal count value HCNT and the blank deletion signal BSK, determines whether or not the horizontal count value HCNT is equal to the standard number of pieces of output data RLN, and determines whether or not the blank deletion signal BSK has been asserted. When the horizontal count value HCNT is equal to the standard number of pieces of output data RLN or the blank deletion signal BSK has been asserted, the horizontal synchronizing signal generating unit 52 executes block 216. When the horizontal count value HCNT is not equal to the standard number of pieces of output data RLN and the blank deletion signal BSK has not been asserted, the horizontal synchronizing signal generating unit 52 executes block 217.

In block 216, the horizontal synchronizing signal generating unit 52 determines whether or not the blank addition signal BAD has been asserted (for example, at the H-level). If the blank addition signal BAD has not been asserted (NO in block 216), the horizontal synchronizing signal generating unit 52 executes block 214. If the blank addition signal BAD has been asserted (YES in block 216), the horizontal synchronizing signal generating unit 52 stands by.

Next, in block 217, based on the start signal OPEN, the horizontal synchronizing signal generating unit 52 determines whether or not the re-input process has been ended. For example, when the start signal OPEN is at an H-level, the horizontal synchronizing signal generating unit 52 determines that the process has not been ended (NO in block 217) and executes block 218. When the start signal OPEN is at the L-level, the horizontal synchronizing signal generating unit 52 determines that re-input has been ended (YES in block 217) and terminates the process.

In block 218, the horizontal synchronizing signal generating unit 52 determines whether or not the vertical synchronizing signal VD has been asserted (for example, at the H-level). If the vertical synchronizing signal VD has been asserted (YES in block 218), the horizontal synchronizing signal generating unit 52 executes block 213. If the vertical synchronizing signal VD has not been asserted (NO in block 218), the horizontal synchronizing signal generating unit 52 executes block 215.

Next, processes of the vertical synchronizing signal generating unit 53 will be described.

Figure 13A:
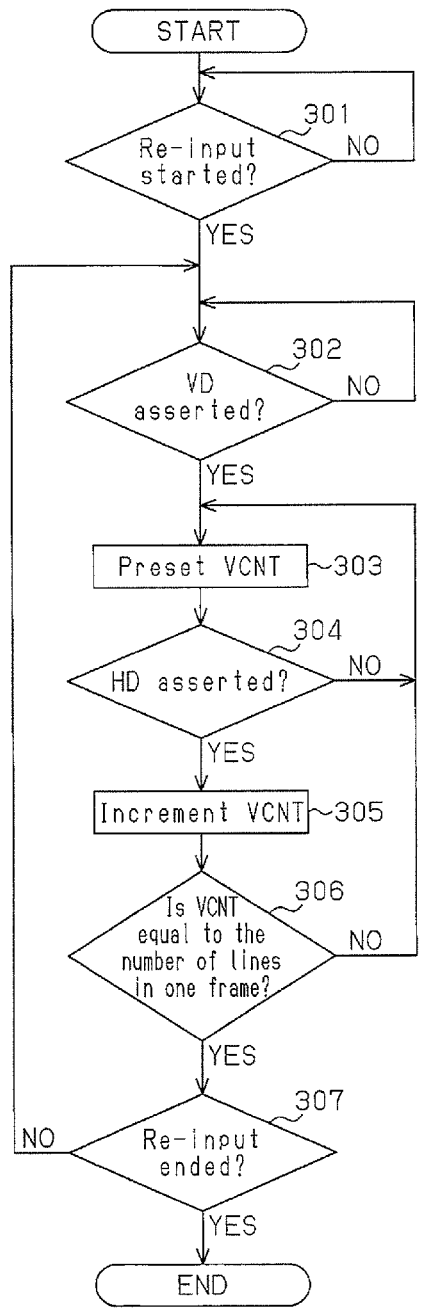
FIGS. 13A and 13B are flow charts illustrating processes performed by a vertical synchronizing signal generating unit.

FIG. 13A illustrates processes related to the vertical count value VCNT.

First, in block 301, based on the start signal OPEN, the vertical synchronizing signal generating unit 53 determines whether or not re-input has been started. For example, the vertical synchronizing signal generating unit 53 determines that re-input has been started based on an H-level start signal OPEN (YES in block 301), and if not, determines that re-input has not been started (NO in block 301).

In block 302, the vertical synchronizing signal generating unit 53 determines whether or not the vertical synchronizing signal VD has been asserted (for example, at the H-level). For example, when the vertical synchronizing signal VD has not been asserted (NO in block 302), the vertical synchronizing signal generating unit 53 stands by. Once the vertical synchronizing signal VD is asserted, in block 303, the vertical synchronizing signal generating unit 53 presets the vertical count value VCNT to a certain value (for example, "0").

In block 304, the vertical synchronizing signal generating unit 53 determines whether or not the horizontal synchronizing signal HD has been asserted. If the horizontal synchronizing signal HD has not been asserted (NO in block 304), the vertical synchronizing signal generating unit 53 executes block 303. If the horizontal synchronizing signal HD has been asserted (YES in block 304), in block 305, the vertical synchronizing signal generating unit 53 increments the vertical count value VCNT.

In block 306, the vertical synchronizing signal generating unit 53 determines whether or not the vertical count value VCNT has become equal to the number of lines in one frame. The number of lines in one frame is a sum of the vertical preceding blank size VSB, the vertical image size VIMG, and the vertical succeeding blank size VEB. When the vertical count value VCNT is not equal to the number of lines in one frame (NO in block 306), the vertical synchronizing signal generating unit 53 executes block 303. When the vertical count value VCNT is equal to the number of lines in one frame (YES in block 306), the vertical synchronizing signal generating unit 53 executes block 307.

In block 307, based on the start signal OPEN, the vertical synchronizing signal generating unit 53 determines whether or not the re-input process has been ended. For example, when the start signal OPEN is at an H-level, the vertical synchronizing signal generating unit 53 determines that the process has not been ended (NO in block 307) and executes block 302. On the other hand, when the start signal OPEN is at the L-level, the vertical synchronizing signal generating unit 53 determines that re-input has been ended (YES in block 307) and terminates the process.

Figure 13B:
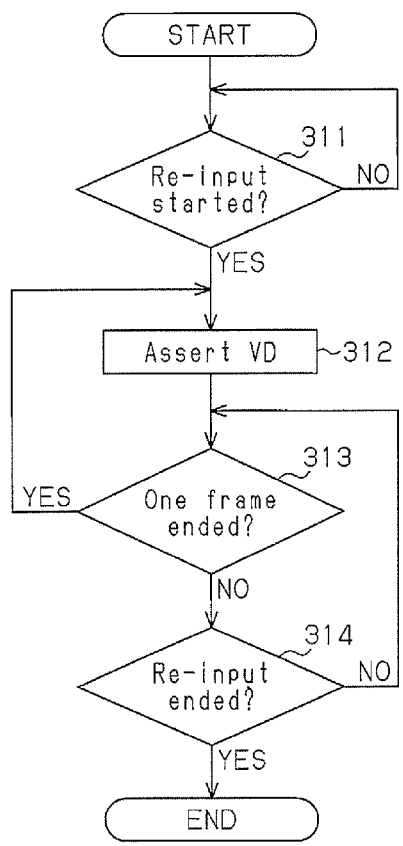

FIG. 13B illustrates processes related to the vertical synchronizing signal VD.

First, in block 311, based on the start signal OPEN, the vertical synchronizing signal generating unit 53 determines whether or not re-input has been started. For example, when the vertical synchronizing signal generating unit 53 determines that re-input has been started based on an H-level start signal OPEN (YES in block 311), in block 312, the vertical synchronizing signal generating unit 53 asserts the vertical synchronizing signal VD (for example, at the H-level).

In block 313, the vertical synchronizing signal generating unit 53 determines whether or not transfer of one frame has been ended. For example, this determination is made based on the vertical count value VCNT and the horizontal count value HCNT. When the vertical count value VCNT is equal to the number of lines in one frame and the horizontal count value HCNT is equal to the number of pieces of data in the horizontal direction in the vertical succeeding blank data VEB adjusted in accordance with addition or deletion of blank data, the vertical synchronizing signal generating unit 53 determines that transfer of one frame has been ended. When transfer of one frame has been ended (YES in block 313), the vertical synchronizing signal generating unit 53 executes block 312, and when transfer of one frame has not been ended (NO in block 313), the vertical synchronizing signal generating unit 53 executes block 314.

In block 314, based on the start signal OPEN, the vertical synchronizing signal generating unit 53 determines whether or not the re-input process has been ended. For example, when the start signal OPEN is at an H-level, the vertical synchronizing signal generating unit 53 determines that the process has not been ended (NO in block 314) and executes block 313. On the other hand, when the start signal OPEN is at the L-level, the vertical synchronizing signal generating unit 53 determines that re-input has been ended (YES in block 314) and terminates the process.

Figure 14:
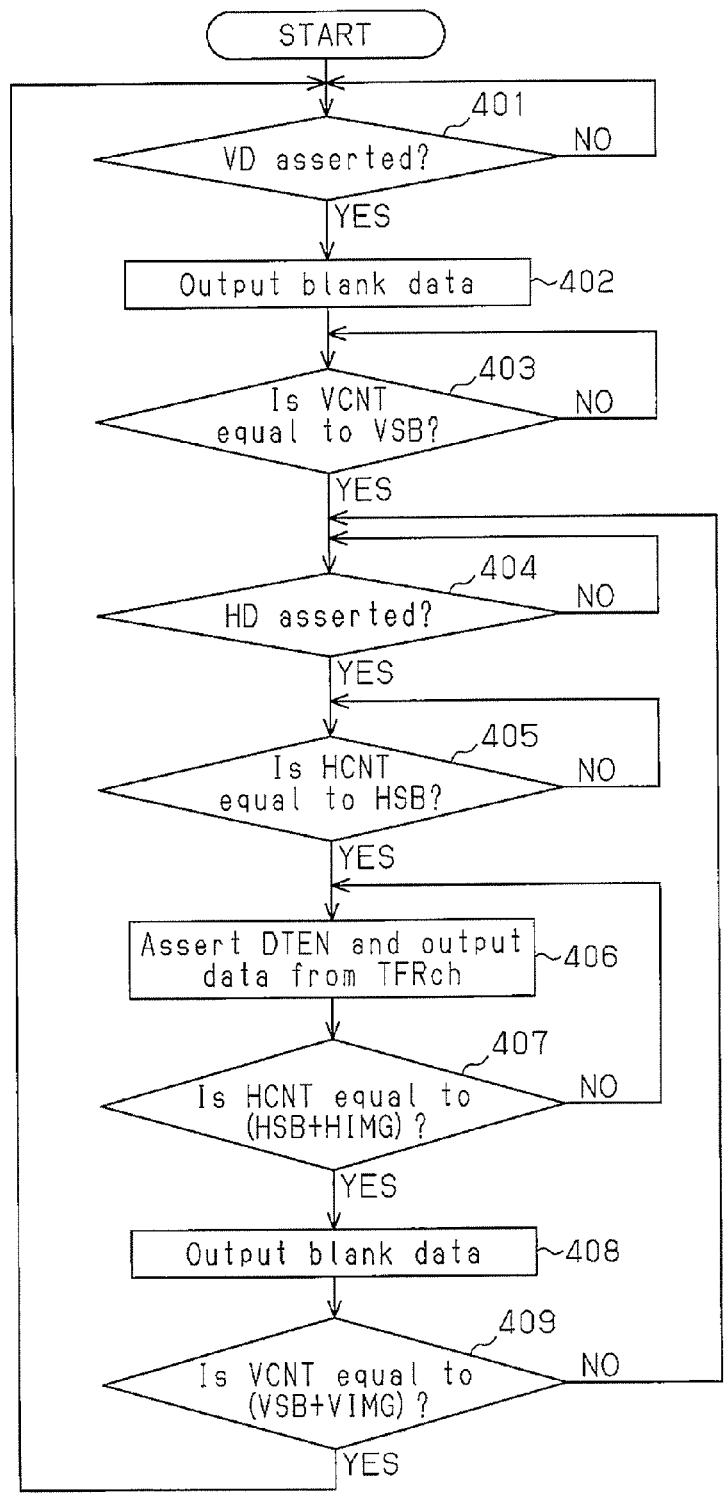
FIG. 14 is a flow chart illustrating processes performed by an image data output unit.

Processes of the output data generating unit 54 will be described with reference to FIG. 14.

First, in block 401, the output data generating unit 54 determines whether or not the vertical synchronizing signal VD has been asserted (for example, at the H-level). For example, when the vertical synchronizing signal VD has not been asserted (NO in block 401), the output data generating unit 54 stands by. Once the vertical synchronizing signal VD has been asserted, in block 402, the output data generating unit 54 outputs blank data.

Next, in block 403, the output data generating unit 54 determines whether or not the vertical count value VCNT has become equal to the vertical preceding blank size VSB. When the vertical count value VCNT is not equal to the vertical preceding blank size VSB (NO in block 403), the output data generating unit 54 stands by. When the vertical count value VCNT becomes equal to the vertical preceding blank size VSB (YES in block 403), in block 404, the output data generating unit 54 determines whether the horizontal synchronizing signal HD has been asserted (for example, at the H-level). When the horizontal synchronizing signal HD has not been asserted (NO in block 404), the output data generating unit 54 stands by. When the horizontal synchronizing signal HD is asserted (YES in block 404), in block 405, the output data generating unit 54 determines whether the horizontal count value HCNT has become equal to the horizontal preceding blank size HSB. When the horizontal count value HCNT is not equal to the horizontal preceding blank size HSB (NO in block 405), the output data generating unit 54 stands by. When the horizontal count value HCNT becomes equal to the horizontal preceding blank size HSB (YES in block 405), in block 406, the output data generating unit 54 asserts the data request signal DTEN (for example, at the H-level) and outputs image data PD that is equivalent to the image data RDT supplied from the transfer control circuit 32a.

Next, in block 407, the output data generating unit 54 determines whether or not the horizontal count value HCNT has become equal to the sum of the horizontal preceding blank size HSB and the horizontal image size HIMG. In other words, the output data generating unit 54 determines whether or not output of the image data GD in one line has been completed. When the horizontal count value HCNT is not equal to the sum (NO in block 407), the output data generating unit 54 executes block 406. When the horizontal count value HCNT is equal to the sum (YES in block 407), the output data generating unit 54 outputs blank data in block 408.

Next, in block 409, the output data generating unit 54 determines whether or not the vertical count value VCNT has become equal to the sum of the vertical preceding blank size VSB and the vertical image size VIMG. In other words, the output data generating unit 54 determines whether or not output of the image data GD in one frame has been completed. When the vertical count value VCNT is not equal to the sum (NO in block 409), the output data generating unit 54 executes block 404, and when the vertical count value VCNT is equal to the sum (YES in block 409), the output data generating unit executes block 401.

Figure 15:
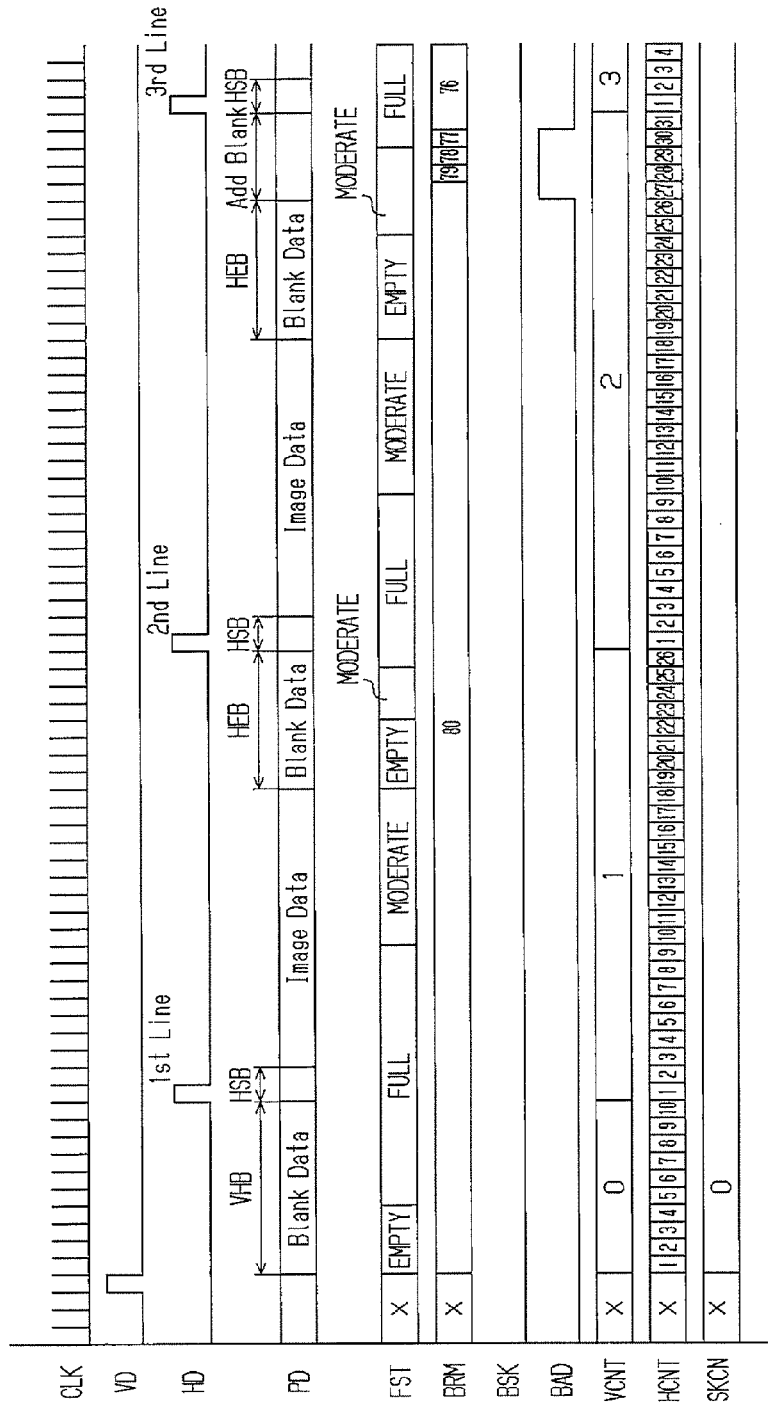
FIGS. 15 to 17 are operation timing diagrams of a signal generating unit.

Next, operations of the transfer control circuit 32a and the signal generating unit 32b will be described with reference to FIGS. 15 and 16.

First, when the vertical synchronizing signal VD is asserted, the signal generating unit 32b calculates the total number of pieces of blank data BRM per frame. In the example illustrated in FIG. 15, the total number of pieces of blank data BRM is "80". In the example, the vertical preceding blank size VSB is "0" and the vertical preceding blank data VSB is not outputted.

The inter-synchronizing signal blank size VHB is outputted in response to the vertical synchronizing signal VD. During an output period of the inter-synchronizing signal blank size VHB, the transfer control circuit 32a illustrated in FIG. 2 outputs a request signal REQ to the memory I/F 45 and reads image data of the memory 13. Therefore, in the example illustrated in FIG. 15, the memory state signal FST or, in other words, a state of the FIFO memory 32d of the transfer control circuit 32a changes from "EMPTY" to "FULL".

Next, when the horizontal synchronizing signal HD is asserted, the horizontal count value HCNT is preset to a certain value (for example, "1") and processing on a first line is performed. In other words, after the horizontal preceding blank data HSB is outputted, image data is outputted. In accordance with the output of the image data, the memory state signal FST changes from "FULL" to "MODERATE".

Once a certain number of pieces (horizontal image size HIMG) of image data is outputted, the horizontal succeeding blank data HEB is outputted. At this point, in accordance with data read from the memory 13 illustrated in FIG. 2, the memory state signal FST changes from "EMPTY" to "MODERATE" and then to "FULL". In this manner, in a period during which the horizontal succeeding blank data HEB is outputted, the state of the FIFO memory 32d changes to "FULL". Therefore, when an output period of the horizontal succeeding blank data HEB ends, the horizontal synchronizing signal HD is asserted for processing of a next line.

In accordance with the assertion of the horizontal synchronizing signal HD, the horizontal count value HCNT is preset to a certain value (for example, "1") and processing on a second line is performed. In other words, after the horizontal preceding blank data HSB is outputted, image data is outputted. Once a certain number of pieces (horizontal image size HIMG) of image data is outputted, the horizontal succeeding blank data HEB is outputted. While the memory state signal FST changes from "EMPTY" to "MODERATE", a "FULL" state has not yet been reached. Therefore, the blank addition signal BAD is asserted. Blank data is outputted based on the asserted blank addition signal BAD, and the total number of pieces of blank data BRM is decremented every time a piece of blank data is outputted. At this point, the memory state signal FST changes from "MODERATE" to "FULL" in accordance with data read from the memory 13 illustrated in FIG. 2. As a result, the blank addition signal BAD is negated and the horizontal synchronizing signal HD is asserted.

As described above, the blank addition signal BAD is asserted so that the memory state signal FST changes to "FULL". The period during which the horizontal succeeding blank data HEB is outputted is extended until the memory state signal FST changes to "FULL". With the extension of the output period of the horizontal succeeding blank data HEB, the total number of pieces of blank data BRM is reduced.

Figure 16:
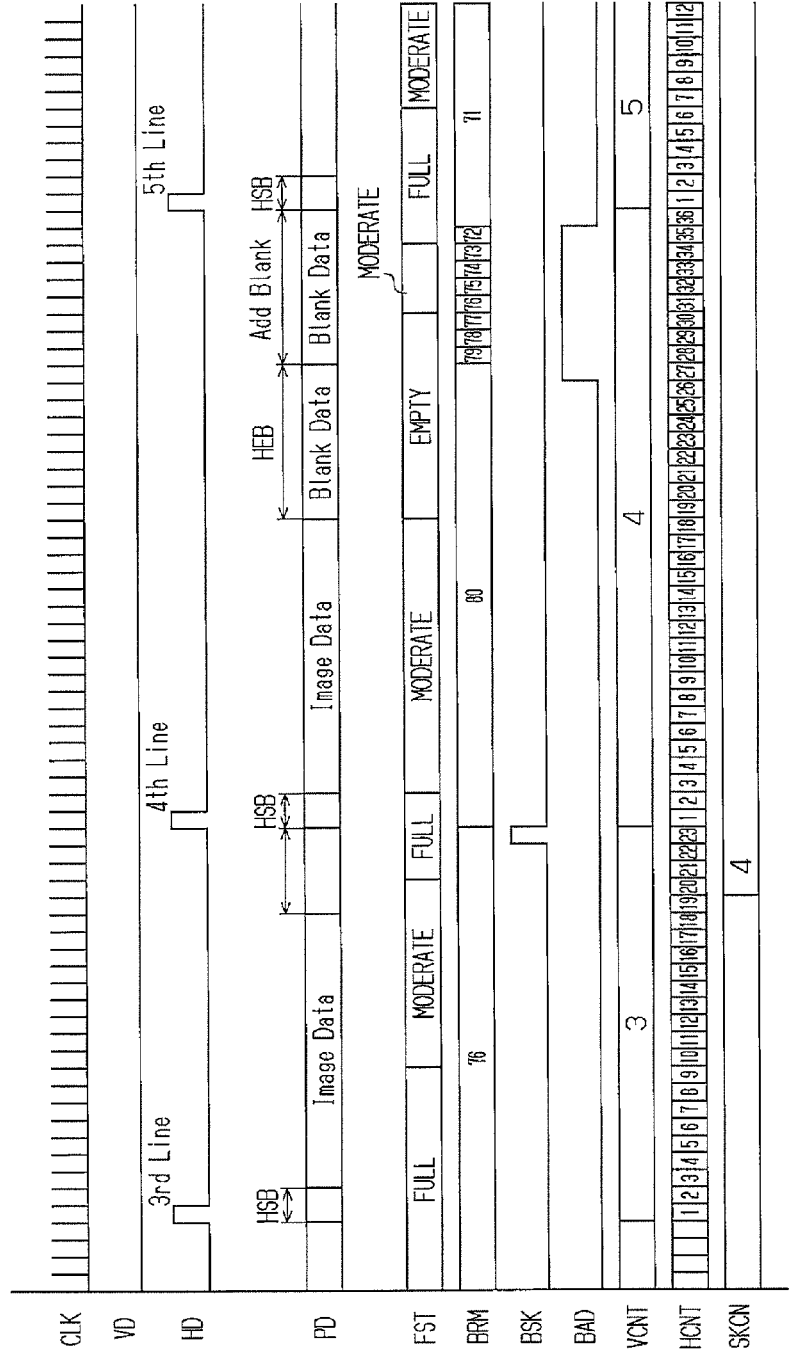

Next, as illustrated in FIG. 16, when a next vertical synchronizing signal VD is asserted, the horizontal count value HCNT is preset and processing on a third line is performed. In other words, after the horizontal preceding blank data HSB is outputted, output of image data is started. When a certain number of pieces (the horizontal image size HIMG) of image data is outputted, the memory state signal FST is "MODERATE". During the output period of the horizontal succeeding blank data HEB, the memory state signal FST changes from "MODERATE" to "FULL". Since the total number of pieces of blank data BRM is smaller than the initial value IBRM, the number of deleted pieces SKCN is calculated. In this example, the number of deleted pieces SKCN is "4". Based on the calculated number of deleted pieces SKCN, the blank deletion signal BSK is asserted at a timing where blank data is deleted. The horizontal synchronizing signal HD is asserted in accordance with the assertion of the blank deletion signal BSK. The number of deleted pieces SKCN is added to the total number of pieces of blank data BRM.

In a similar manner, in accordance with the assertion of a next horizontal synchronizing signal HD, the horizontal count value HCNT is preset to a certain value and processing on a fourth line is performed. In other words, after the horizontal preceding blank data HSB is outputted, output of image data is started. Once a certain number of pieces (horizontal image size HIMG) of image data is outputted, the horizontal succeeding blank data HEB is outputted. At this point, the memory state signal FST is "EMPTY". Therefore, the blank addition signal BAD is asserted. Blank data is outputted based on the asserted blank addition signal BAD, and the total number of pieces of blank data BRM is decremented every time a piece of blank data is outputted. At this point, the memory state signal FST changes from "EMPTY" to "MODERATE" and then to "FULL" in accordance with data read from the memory 13 illustrated in FIG. 2. As a result, the blank addition signal BAD is negated and the horizontal synchronizing signal HD is asserted.

Figure 17:
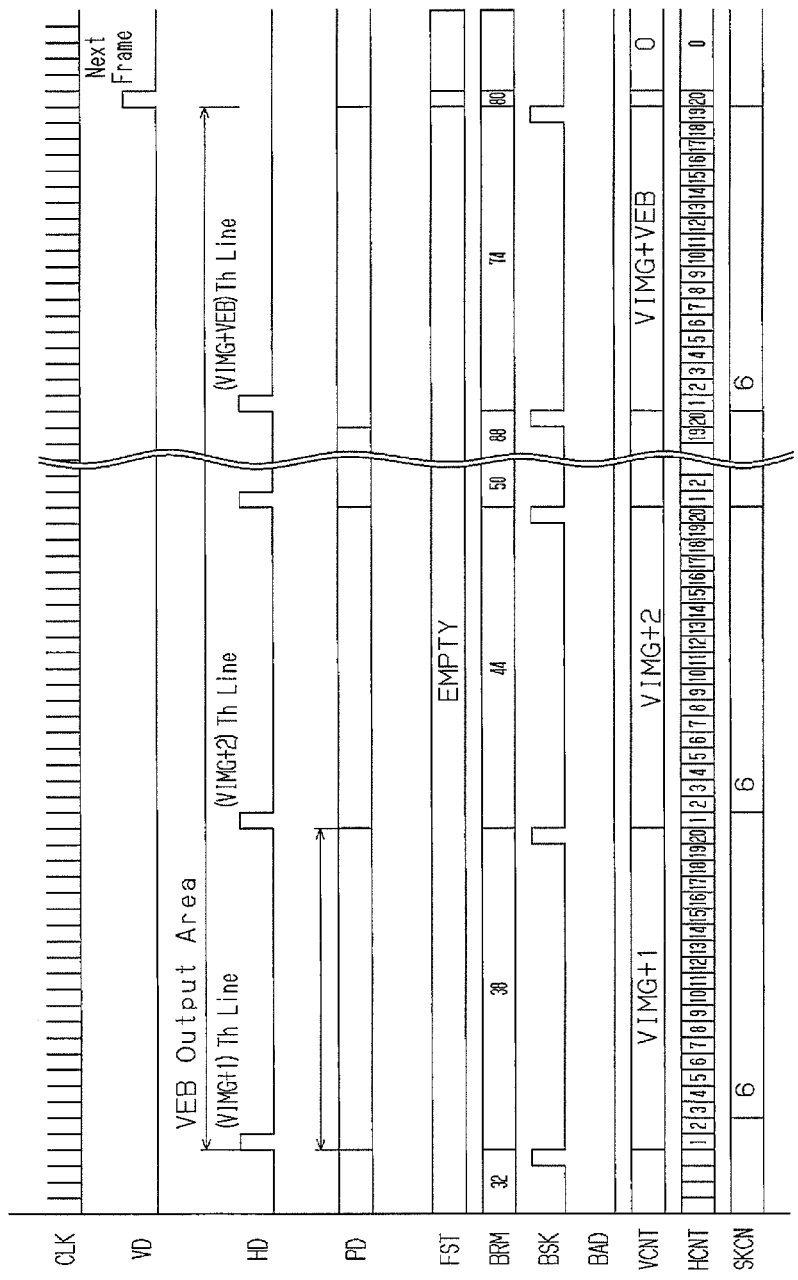

Processing in a VEB output area or, in other words, processing during a period in which the vertical succeeding blank data VEB is outputted will be described with reference to FIG. 17.

First, the horizontal synchronizing signal HD is asserted, the horizontal count value HCNT is preset, and processing of a (VIMG+1)-th line is performed. The horizontal count value HCNT is incremented each time a piece of blank data is outputted.

The number of deleted pieces SKCN per line of the vertical succeeding blank data VEB is calculated. For example, the number of deleted pieces SKCN is obtained by dividing a result of subtracting the total number of pieces of blank data BRM from the initial value IBRM by the vertical preceding blank size VSB. For example, the number of deleted pieces SKCN is "6". Based on the number of deleted pieces SKCN and the standard number of pieces of output data RLN, the blank deletion signal BSK is asserted at a position where the horizontal count value HCNT is equal to a value obtained by subtracting the number of deleted pieces SKCN from the standard number of pieces of output data RLN. The horizontal synchronizing signal HD is asserted in accordance with the assertion of the blank deletion signal BSK and processing of a next line (a (VIMG+2)-th line) is started. The number of deleted pieces SKCN is added to the total number of pieces of blank data BRM.

The processing described above is repeated until a final line of one frame or, in other words, a (VIMG+VEB)-th line of one frame. Once processing of the (VIMG+VEB)-th line ends or, in other words, the processing of one frame ends, the total number of pieces of blank data BRM becomes equal to the initial value IBRM. Therefore, the number of pieces of image data PD that is outputted between two vertical synchronizing signals VD is equal to the number of pieces of image data PD that is outputted when blank data is not controlled. Accordingly, the time between two vertical synchronizing signals VD or, in other words, a cycle of the vertical synchronizing signal VD remains unchanged.

Figure 18A:
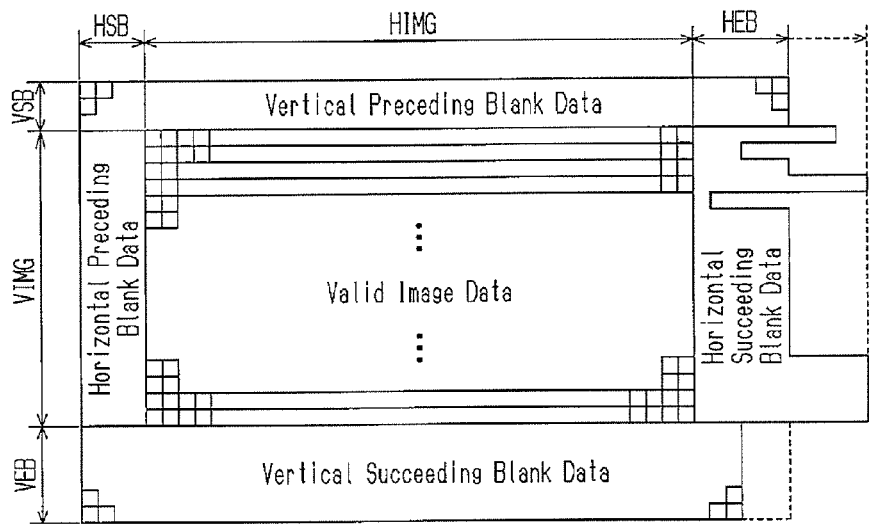
FIGS. 18A and 18B are schematic views of image data of one frame.

As illustrated in FIG. 18A, in the image data PD of one frame, the size (the number of pieces of data) of the horizontal succeeding blank data HEB in each line including the image data GD varies according to the timing at which the horizontal synchronizing signal HD is outputted. The output timing of the horizontal synchronizing signal HD is based on the blank addition signal BAD and the blank deletion signal BSK or, in other words, based on a data storage state in the FIFO memory 32d. The number of pieces of data of the blank data BD in each piece of line data of the vertical succeeding blank data VEB is adjusted in accordance with the size of the horizontal succeeding blank data HEB in each line.

Figure 18B:
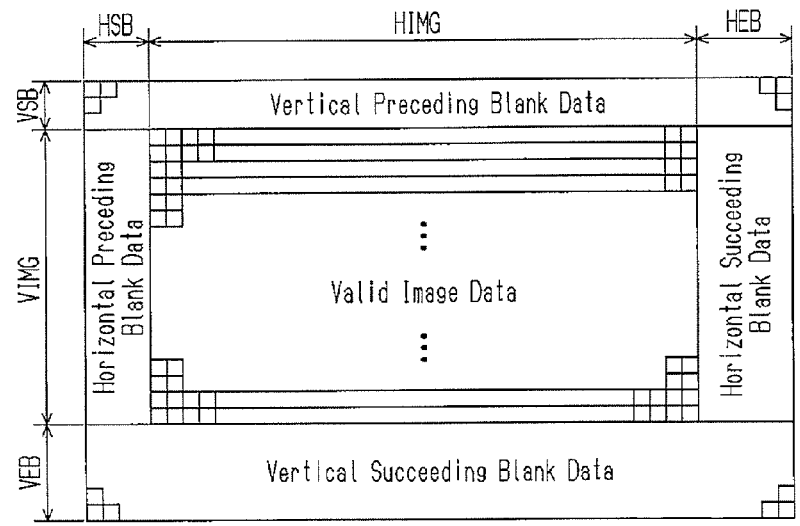

FIG. 18B illustrates image data PD of one frame in a case where the number of pieces of data of the horizontal succeeding blank data HEB and the number of pieces of data of blank data BD in each piece of line data of the vertical succeeding blank data VEB are not adjusted. The overall numbers of pieces of data in the image data PD illustrated in FIG. 18A and the image data PD illustrated in FIG. 18B are the same.

The present embodiment achieves the following advantageous effects.

The transfer control circuit 32a stores image data MDT read from the memory 13 in the FIFO memory 32d. The transfer control circuit 32a outputs image data RDT read from the FIFO memory 32d to the output data generating unit 54 in response to a data request signal DTEN outputted from the output data generating unit 54. The transfer control circuit 32a outputs a memory state signal FST corresponding to the storage state of data in the FIFO memory 32d. After outputting output data PD (the image data RDT) with the horizontal image size HIMG in accordance with a horizontal count value HCNT, the output data generating unit 54 outputs blank data BD. Based on the memory state signal FST, when the blank control unit 51 determines that the state of the FIFO memory 32d is "EMPTY" or "MODERATE" in a period in which the output data generating unit 54 outputs horizontal succeeding blank data HEB, the blank control unit 51 asserts a blank addition signal BAD until the state of the FIFO memory 32d changes to "FULL".

Accordingly, in data transfer where the image data MDT stored in the memory 13 is transferred to the correction circuit 32c, a transfer failure is suppressed in which the image data RDT to be outputted to the correction circuit 32c misses an output timing. In other words, when the blank addition signal BAD is asserted at a timing at which a horizontal synchronizing signal HD is outputted based on the horizontal count value HCNT, the horizontal synchronizing signal generating unit 52 outputs the horizontal synchronizing signal HD in response to a negation of the blank addition signal BAD. Therefore, when the horizontal synchronizing signal HD is outputted, the state of the FIFO memory 32d is "FULL". As a result, even if data readout from the memory 13 is delayed by an access made by the correction unit 33 or the like illustrated in FIG. 1, the amount of stored data in the FIFO memory 32d is unlikely to fall below "0". Therefore, a transfer failure is suppressed.

Since transfer failures are reduced at the transfer control circuit 32a and the signal generating unit 32b, processes performed by the correction circuit 32c are performed in a reliable manner. For example, the correction circuit 32c receives image data PD in accordance with the horizontal synchronizing signal HD and the vertical synchronizing signal VD and performs processing on the image data PD. When a transfer failure is caused by a horizontal synchronizing signal HD during transfer of image data PD of one line, an error may occur in the processing. In such a case, corresponding image data of one line or image data of one frame may be once again read from the memory 13 and a delay of processing may occur. In addition, the present inventors considered generating a weight signal for interrupting processing in the case of a transfer failure. However, configuring a circuit for exchanging weight signals or configuring the correction circuit 32c to be capable of interrupting processing with weight signals increases the circuit size of the correction circuit 32c accordingly. Therefore, in the present embodiment, since the correction circuit 32c performs processing based on image data PD of one line by the horizontal synchronizing signal HD, a circuit for weight signals is not required and the correction circuit 32c need not be configured so as interrupt processing based on image data PD of one line. As a result, an increase in circuit size of the image signal processor 12 including the correction circuit 32c is suppressed.

The blank control unit 51 adjusts an output timing of the horizontal synchronizing signal HD during a period in which the vertical succeeding blank data VEB is transferred in accordance with the total number of pieces of blank data BRM or, in other words, the number of pieces of blank data BD increased or decreased in each line including the image data GD. Accordingly, the blank control unit 51 adjusts the number of pieces of blank data BD in each piece of line data. Therefore, the number of pieces of data of image data PD outputted from the output data generating unit 54 between vertical synchronizing signals VD becomes equal to the number of pieces of data of image data PD when the number of pieces of blank data BD is not adjusted. Since the cycle of the vertical synchronizing signal VD is unchanged and processing time for one frame is also unchanged, for example, when consecutively processing successive frames as in the case of a moving image, the processing is performed without modifying frame rates.

The embodiments may be modified as follows.

The request signal REQ may be outputted in accordance with the data amount MNM and/or the data storage efficiency MRT.

The transfer control circuit 32a may output the memory state signal FST in accordance with the data amount MNM and/or the available capacity MEP.

In the embodiments described above, the state of the FIFO memory 32d may be determined to be one of two or one of four or more states, whereby the memory state signal FST may be outputted in accordance with the determined state.

The total number of pieces of blank data BRM may be set by a user. For example, the set value is stored in the register 32e. In this case, the value set by the user or, in other words, the value stored in the register 32e may be adopted as the initial value IBRM. In block 103 illustrated in FIG. 6, the initial value IBRM stored in the register 32e is read, and the readout value is adopted as the total number of pieces of blank data BRM. In this example, block 104 illustrated in FIG. 6 may be omitted.

During a period in which the vertical succeeding blank data VEB is transferred, the numbers of pieces of data of blank data BD may differ among pieces of line data.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A data transfer device comprising:
   a transfer control circuit that reads data stored in a first storage unit to store the data in a second storage unit, outputs data in the second storage unit in response to a data request signal, and outputs a state signal in accordance with an amount of stored data in the second storage unit;
   a blank control unit that receives the state signal from the transfer control circuit and outputs a blank addition signal, wherein when the state signal indicates that the second storage unit is in a first storage state in which a first amount of data is stored in the second storage unit or the second storage unit is in a second storage state in which a second amount of data is stored in the second storage unit, the second amount of data is less than the first amount of data, the blank control unit outputs the blank addition signal until the second storage unit changes to the first storage state based on the state signal;

a horizontal synchronizing signal generating unit that receives the blank addition signal from the blank control unit, and generates a horizontal synchronizing signal and a horizontal count value, and delays the horizontal synchronizing signal in accordance with the blank addition signal, the horizontal count value and a standard number of pieces of output data; and an output data generating unit that receives image data having a horizontal image size from the transfer control circuit and outputs the image data having the horizontal image size in accordance with the horizontal count value and the horizontal synchronizing signal, wherein after the outputting the image data having the horizontal image size is completed, the output data generating unit outputs blank data until a next horizontal synchronizing signal is outputted.

2. The data transfer device according to claim 1, wherein the blank control unit outputs a blank deletion signal when the state signal indicates the first storage state of the second storage unit during a period in which the output data generating unit is outputting the blank data after the image data based on the horizontal count value, and the horizontal synchronizing signal generating unit outputs a next horizontal synchronizing signal in response to the blank deletion signal and presets the horizontal count value.

3. The data transfer device according to claim 2, wherein the blank control unit stores an initial value of the total number of pieces of blank data in a register, counts down the total number of pieces of blank data in a period in which the blank addition signal is outputted, calculates the number of deleted pieces by subtracting the total number of pieces of blank data from the initial value when the state signal indicates the first storage state of the second storage unit during a period in which the output data generating unit is outputting the blank data after the image data, determines a blank data deletion position by comparing the number of deleted pieces with a first value based on a difference between the standard number of pieces of output data and the horizontal count value, and outputs the blank deletion signal when the horizontal count value is the blank data deletion position.

4. The data transfer device according to claim 3, wherein the blank control unit does not output the blank deletion signal when the state signal indicates the first storage state of the second storage unit and the total number of pieces of blank data is equal to the initial value during a period in which the output data generating unit is outputting the blank data after the image data.

5. The data transfer device according to claim 1, wherein the number of pieces of blank data that is outputted in a period in which a horizontal succeeding blank is outputted is adjusted in accordance with the total number of pieces of blank data.

6. The data transfer device according to claim 5, wherein to adjust the number of pieces of blank data that is outputted in a period in which a horizontal succeeding blank is outputted, the blank control unit outputs the blank deletion signal at a timing in accordance with a difference between the total number of pieces of blank data and the initial value, and the horizontal synchronizing signal generating unit outputs the horizontal synchronizing signal in accordance with the blank deletion signal.

7. The data transfer device according to claim 5, wherein the blank control unit subtracts the total number of pieces of blank data from the initial value, divides the value after subtraction by a size of the horizontal succeeding blank, and outputs the blank deletion signal when a value obtained by subtracting the value after division from the standard number of pieces of output data is equal to the horizontal count value.

8. A method of transferring data stored in a first storage unit, the method comprising:

reading, by a transfer control circuit, data stored in the first storage unit and storing the read data in a second storage unit;

outputting, by the transfer control circuit, data in the second storage unit in response to a data request signal;

generating, by the transfer control circuit, a state signal in accordance with an amount of stored data in the second storage unit;

when the second storage unit is in a first storage state in which a first amount of data is stored in the second storage unit or the second storage unit is in a second storage state in which a second amount of data is stored in the second storage unit, the second amount of data is less than the first amount of data, generating, by a blank control unit that receives the state signal from the transfer control circuit, a blank addition signal until the second storage unit changes to the first storage state based on the state signal;

generating, by a horizontal synchronizing signal generating unit that receives the blank addition signal from the blank control unit, a horizontal synchronizing signal and a horizontal count value;

delaying, by a horizontal synchronizing signal generating unit, the horizontal synchronizing signal in accordance with the blank addition signal, the horizontal count value and a standard number of pieces of output data;

receiving, by an output data generating unit, image data having a horizontal image size from the second storage unit and outputting the image data having the horizontal image size in accordance with the horizontal count value and the horizontal synchronizing signal; and after the outputting the image data having the horizontal image size is completed, outputting, by the output data generating unit, blank data until a next horizontal synchronizing signal is outputted.

9. The method according to claim 8, further comprising:

outputting a blank deletion signal when the state signal indicates the first storage state of the second storage unit during a period in which the blank data is outputted after the image data based on the horizontal count value; and outputting a next horizontal synchronizing signal in response to the blank deletion signal and presetting the horizontal count value.

10. The method according to claim 9, further comprising adjusting the number of pieces of blank data that is outputted in a period in which a horizontal succeeding blank is outputted in accordance with timings of the blank addition signal and the blank deletion signal.

11. A semiconductor device comprising:

a plurality of processing units that accesses a first storage unit and outputs a request signal for accessing the first storage unit; and an arbitration unit that arbitrates a plurality of request signals outputted from the plurality of processing units, wherein at least one of the plurality of processing units includes the data transfer device according to claim 1.

* * * * *